(12) United States Patent
Srinivasan et al.

(10) Patent No.: US 11,039,061 B2
(45) Date of Patent: Jun. 15, 2021

(54) CONTENT ASSISTANCE IN A THREE-DIMENSIONAL ENVIRONMENT

(71) Applicant: Microsoft Technology Licensing, LLC, Redmond, WA (US)

(72) Inventors: Vidya Srinivasan, Issaquah, WA (US); Andrew John Howe, Sammamish, WA (US); Michael Lee Smith, Kirkland, WA (US); Amy Scarfone, Seattle, WA (US); Purnima Rao, Bellevue, WA (US); Aniket Handa, Seattle, WA (US); Nathan Bradley Duke, Kirkland, WA (US); Colton Brett Marshall, Redmond, WA (US); Harold Anthony Martinez Molina, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 16/413,455

(22) Filed: May 15, 2019

(65) Prior Publication Data
US 2020/0366832 A1     Nov. 19, 2020

(51) Int. Cl.
*G06T 7/73*     (2017.01)
*H04N 5/232*     (2006.01)
(Continued)

(52) U.S. Cl.
CPC ........... *H04N 5/23218* (2018.08); *G06T 7/75* (2017.01); *G06T 15/20* (2013.01); *G06T 19/003* (2013.01); *H04N 5/2224* (2013.01)

(58) Field of Classification Search
CPC .... H04N 5/23218; H04N 5/2224; G06T 7/75; G06T 15/20; G06T 19/003; G06F 30/12; G06F 3/04845; G06F 3/04815
(Continued)

(56) References Cited

U.S. PATENT DOCUMENTS 10,181,218 B1    1/2019   Goetzinger et al.
10,339,721 B1 *   7/2019   Dascola ............ H04M 1/72522
(Continued)

FOREIGN PATENT DOCUMENTS

EP        2469474 A1    6/2012
WO     2019046597 A1    3/2019

OTHER PUBLICATIONS

"Non Final Office Action Issued in U.S. Appl. No. 16/413,528", dated Aug. 18, 2020, 19 Pages.
(Continued)

*Primary Examiner* — Ali Bayat
(74) *Attorney, Agent, or Firm* — Newport IP, LLC; Scott Y. Shigeta

(57) ABSTRACT

Systems and methods of maintaining a focal point of a camera in a 3D environment of a 2D graphical user interface of an authoring application includes displaying a surface upon which one or more content items can be placed and a camera centrally positioned relative to the surface. Further, responsive to an indication to add a content, determining a first elevation of the camera, determining an angle of view of the camera at the first elevation and elevating the camera to a second elevation that is greater than the first elevation of the camera while maintaining a perceived angle of view of the camera. Systems and methods for translating a 3D object include preventing translation of the 3D object in one of three dimensions of the three-dimensional environment while enabling simultaneous translation of the 3D object in the two remaining dimensions of the three dimensions of the 3D environment.

20 Claims, 17 Drawing Sheets

(51) Int. Cl.
*G06T 15/20* (2011.01)
*G06T 19/00* (2011.01)
*H04N 5/222* (2006.01)

(58) Field of Classification Search
USPC .......................................................... 382/103
See application file for complete search history.

(56) References Cited

U.S. PATENT DOCUMENTS

| | | | |
|---|---|---|---|
| 2001/0044858 A1* | 11/2001 | Rekimoto | G06F 3/00 |
| | | | 710/1 |
| 2002/0018061 A1 | 2/2002 | Gantt | |
| 2007/0120846 A1* | 5/2007 | Ok | G06F 3/04815 |
| | | | 345/419 |
| 2009/0055735 A1 | 2/2009 | Zaleski et al. | |
| 2010/0095248 A1 | 4/2010 | Karstens | |
| 2010/0321391 A1 | 12/2010 | Beckman et al. | |
| 2012/0075343 A1 | 3/2012 | Chen et al. | |
| 2012/0229449 A1 | 9/2012 | Psistakis et al. | |
| 2013/0187912 A1 | 7/2013 | Mueller | |
| 2013/0235234 A1* | 9/2013 | Cucci | H04N 5/232939 |
| | | | 348/231.99 |
| 2014/0058959 A1 | 2/2014 | Isbjornssund et al. | |
| 2014/0176542 A1* | 6/2014 | Shohara | G06T 15/205 |
| | | | 345/420 |
| 2015/0052479 A1* | 2/2015 | Ooi | G06T 19/006 |
| | | | 715/810 |
| 2015/0091906 A1 | 4/2015 | Dishno | |
| 2015/0254905 A1 | 9/2015 | Ramsby et al. | |
| 2015/0309705 A1 | 10/2015 | Keeler et al. | |
| 2016/0078679 A1 | 3/2016 | Maximo | |
| 2016/0210788 A1 | 7/2016 | Kasahara | |
| 2016/0275209 A1 | 9/2016 | Kelly et al. | |
| 2017/0069143 A1 | 3/2017 | Salter et al. | |
| 2017/0169616 A1 | 6/2017 | Wiley et al. | |
| 2017/0372457 A1* | 12/2017 | Sylvan | G06T 19/006 |
| 2018/0113596 A1 | 4/2018 | Ptak et al. | |
| 2018/0268582 A1 | 9/2018 | Schneider et al. | |
| 2018/0286139 A1 | 10/2018 | Moncayo | |
| 2018/0308274 A1 | 10/2018 | Molina et al. | |
| 2018/0308289 A1 | 10/2018 | Srinivasan et al. | |
| 2018/0314405 A1 | 11/2018 | Le Doux et al. | |
| 2019/0065027 A1* | 2/2019 | Hauenstein | G06F 3/011 |
| 2019/0251076 A1 | 8/2019 | Yan | |
| 2019/0340829 A1 | 11/2019 | Marshall et al. | |
| 2019/0385371 A1 | 12/2019 | Joyce et al. | |
| 2020/0082627 A1 | 3/2020 | Palos et al. | |
| 2020/0111195 A1 | 4/2020 | Vlachos et al. | |
| 2020/0363930 A1 | 11/2020 | Srinivasan et al. | |
| 2020/0364941 A1 | 11/2020 | Srinivasan et al. | |
| 2020/0364942 A1 | 11/2020 | Srinivasan et al. | |
| 2020/0364943 A1 | 11/2020 | Srinivasan et al. | |

OTHER PUBLICATIONS

"International Search Report and Written Opinion Issued in PCT Application No. PCT/US20/028026", dated Jul. 14, 2020, 11 Pages.
"Non Final Office Action Issued in U.S. Appl. No. 16/413,485", dated Jun. 29, 2020, 28 Pages.
"Non Final Office Action Issued in U.S. Appl. No. 16/413,542", dated Jul. 13, 2020, 25 Pages.
"Notice of Allowance Issued in U.S. Appl. No. 16/413,478", dated Jul. 16, 2020, 9 Pages.
"International Search Report and Written Opinion Issued in PCT Application No. PCT/US20/028382", dated Jul. 16, 2020, 11 Pages.
"International Search Report and Written Opinion Issued in PCT Application No. PCT/US20/028384", dated Jul. 30, 2020, 11 Pages.
"SharePoint Spaces", Retrieved From: https://web.archive.org/web/20190401134501/https://www.exploresharepointspaces.com/, Apr. 1, 2019, 9 Pages.
"International Search Report and Written Opinion issued in PCT Application No. PCT/US20/028380", dated Sep. 7, 2020, 19 Pages.
"Final Office Action Issued in U.S. Appl. No. 16/413,542", dated Nov. 2, 2020, 30 Pages.
"International Search Report and Written Opinion Issued in PCT Application No. PCT/US20/028378", dated Jul 24, 2020, 9 Pages.
"Notice of Allowance Issued in U.S. Appl. No. 16/413,478", dated Jan. 12, 2021, 9 Pages.
"Final Office Action Issued in U.S. Appl. No. 16/413,485", dated Jan. 8, 2021, 40 Pages.
"Final Office Action Issued in U.S. Appl. No. 16/413,528", dated Jan. 12, 2021, 22 Pages.
"Non-Final Office Action Issued in U.S. Appl. No. 16/413,542", dated Mar. 24, 2021, 34 Pages.

* cited by examiner

CONTENT ASSISTANCE IN A THREE-DIMENSIONAL ENVIRONMENT

BACKGROUND

Building a three-dimensional (3D) environment, such as a virtual reality (VR), augmented reality (AR), or mixed reality (MR) environment, can be a complex endeavor often requiring an author to have significant programming knowledge of the 3D authoring application being utilized. Due to the significant learning curve involved with most 3D authoring applications, the general public is left to rely upon 3D authoring applications that are simplified for the inexperienced user by limiting the types of content that can be used within a 3D environment and by limiting the amount of control in placing content within the 3D environment.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure describe systems and methods for authoring in a 3D environment. Various aspects of authoring include the ability to place and arrange a variety of content types (e.g., two-dimensional (2D) content, 3D content, 360 degree content, static or dynamic content) in numerous ways the author may envision giving the author a wide range of possibilities to build and customize a VR/AR/MR experience using their own content, e.g. content on their browsers, or content of others. More specifically, the authoring application of the present disclosure provides a user with built-in systems and methods that help to simplify the use and placement of content within a 3D environment by providing automated content assistance, thereby reducing the amount of 3D application programming knowledge required by the user.

In certain aspects, the present disclosure is directed to a vector-based alignment system for a camera, which maintains the camera's focal point in the X-Z plane during translation in the Y-axis. In certain aspects, the present disclosure is directed to scaling content indicators of objects to appear at a same angle regardless of a distance of the object from a camera. In certain aspects, the present disclosure is directed to presenting standardized indicators of content loading into a 3D environment regardless of the content type. In certain aspects, the present disclosure is directed to normalizing three-dimensional models as they load within a 3D environment. In certain aspects, the present disclosure is directed to the translation of 3D objects within a 3D environment through a floor translation mode and a wall translation mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
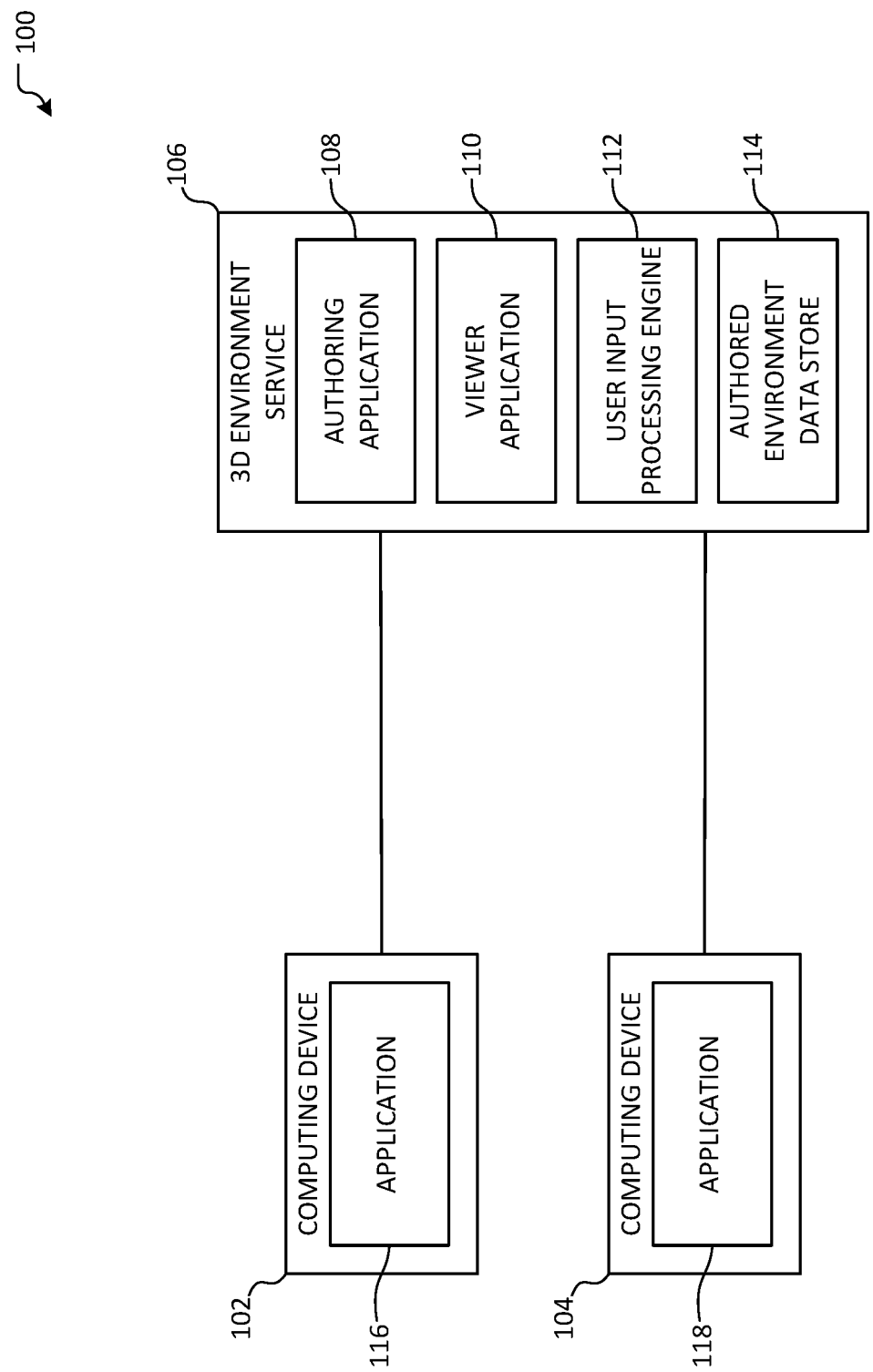
FIG. 1 illustrates an overview of an example system for content assistance in a 3D environment as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

An authoring application of the present disclosure enables a user to create a 3D environment, through use of a 2D graphical user interface (GUI) of the authoring application that presents a development canvas. An author may use the 2D GUI to choose a template of a 3D environment to be placed in the development canvas that can include customizable features, such as customizable background imagery, lighting and sound. A floor of the 3D environment is presented in the form of a platter wherein a view of the platter is provided through a camera that is centrally positioned in the platter. The camera is rotatable through 360 degrees to provide a complete view of the platter and content within the 3D environment. Different types of content (e.g., 2D content, 3D content, 360 degree content, static or dynamic content) can then be placed within the 3D environment by, for example, selecting a file to load into the 3D environment. The content placed within the 3D environment may have been created within the authoring application or by one or more different types of applications (e.g., word processing applications, drawing applications, video applications, etc.). To deal with the varying types of content that can be added to the 3D environment and to provide the user with a simplified experience in adding the content, the authoring application provides a user with built-in assistance systems and methods. The assistance systems and methods help to simplify the placement of content within the 3D environment by providing automated content modification, thereby reducing the amount of 3D application programming knowledge required by the user.

In a certain aspect, the authoring application receives, via the 2D GUI, a user input to add content to the 3D environment. Traditionally, the content would enter the 3D environment with the centrally positioned camera providing a limited ground floor level view of the content. However, to assist in simplifying placement of the content within the 3D environment, the authoring application of the present disclosure responds to the user input by changing the view of the centrally positioned camera from an original view and height to an elevated overview height that provides a broader view of the existing content of the platter. In transitioning the elevation of the camera, the perceived angle of view provided by the camera of the platter is maintained, while the field of view provided by the camera is broadened. Subsequently, upon placement of the content within the 3D environment, the camera is returned to its original position while, once again, maintaining the perceived angle of view provided by the camera.

In a certain aspect, an author of the 3D environment uses the 2D GUI of the authoring application to cause the centrally positioned camera to look to the far left or to the far right of the 3D environment within the confines of a 2D GUI display. Traditionally, in such a context, any object, for example, a content indicator in a 2D format, located at or near the far right or far left of the 2D GUI display (e.g., presented as being located a far distance from the camera) would typically distort within the camera view due to the convex curvature of the camera lens. However, the authoring application of the present disclosure provides assistance to overcome the distortion of the object by scaling the object to appear at the same size and at the same angle regardless of the distance of the object from the camera in a position that may be rotated to align with an upward direction of the camera. In certain aspects, one or more scaled content indicators are displayed in the 2D GUI display and provide loading status information regarding the loading of a selected object (e.g., a 3D object or a 2D object) at a selected position within the 3D environment; the same content indicators can be used for both 3D and 2D objects.

In a certain aspect, an author of the 3D environment loads a 3D object into the 3D environment via the 2D GUI of the authoring application. The 3D object being loaded has been created with a tool that has failed to place a center position of the object at the actual center of the object. Traditionally, in such a context, the 3D object would load within the 3D environment at an unexpected location, due to the offset center, rather than at an author's selected location within the 3D environment. However, the authoring application of the present disclosure provides assistance in positioning the 3D object in the author's desired location by normalizing a center of the 3D object. Normalizing the center includes repositioning the center of the 3D object to a calculated center that is more representative of an actual center of the 3D object than is provided by the original offset center. The normalization enables the 3D object to be presented at a desired location and in a desired orientation within the 3D environment.

In a certain aspect, an author of the 3D environment uses the 2D GUI of the authoring application to load a 3D object into the 3D environment and intends to reposition the loaded 3D object. Traditionally, repositioning a 3D object within a 3D environment would require familiarity with complex professional tools that would move the 3D object one axis at a time, typically through use of a "3D gizmo." However, the authoring application of the present provides assistance in simplifying the repositioning of the 3D object within the 3D environment by providing the 2D GUI with a floor translation mode and a wall translation mode. In each translation mode, the 3D object is moved along two of three axes in the 3D environment while the third axis of the 3D environment is held constant.

Accordingly, the present disclosure provides a plurality of technical benefits including but not limited: providing a broader view of a 3D environment upon receipt of a request to add content; eliminating distortion of 3D objects positioned at a distance that appears to be far from a camera; providing consistent loading status badges across content types; re-centering of 3D objects prior to spawning within a 3D environment; and simplifying the process of repositioning a 3D object.

As used herein, an authoring application is used by an author to create or edit a 3D environment through use of a computing device. The authoring application provides a 2D GUI that enables the creation and/or editing of the 3D environment. The authoring application may be a native application, a web application, or a combination thereof, among other examples. As noted earlier, various types of content may be embedded or included in the 3D environment as content items. Example content includes, but is not limited to, 3D objects (e.g., 3D models, figures, shapes, etc.), 2D objects (e.g., files, images, presentations, documents, web sites, videos, remote resources, etc.), or audio content, among other content.

FIG. 1 illustrates an overview of an example system 100 for content assistance in a 3D environment. As illustrated, system 100 comprises computing devices 102 and 104, and 3D environment service 106. In an example, computing devices 102 and 104 may be any of a variety of computing devices, including, but not limited to, a mobile computing device, a laptop computing device, a tablet computing device, or a desktop computing device. In some examples, 3D environment service 106 is provided as part of a collaborative, communication, or productivity platform. It will be appreciated that while 3D environment service 106 and elements 108-114 are illustrated as separate from computing devices 102 and/or 104, one or more of elements 108-114 may be provided by computing devices 102 and/or 104 other examples. As an example, computing device 102 may comprise authoring application 108, while computing device 104 may comprise viewer application 110.

System 100 illustrates 3D environment service 106 as comprising an authoring application 108, a viewer application 110, a user input processing engine 112, and an authored environment data store 114. The authoring application 108 is used to author a 3D environment according to aspects disclosed herein. In an example, authoring application 108 provides a two-dimensional (2D) graphical user interface (GUI) with which a user graphically designs a 3D environment. For example, authoring application 108 enables an author to select content items and position the content items within the 3D environment accordingly. In examples, authoring application 108 presents a list of available environment events, which an author uses to associate one or more actions of a content item with a selected environment event. As discussed in greater detail below, an end user may then use viewer application 110 to consume the 3D environment and interact with content items.

3D environment service 106 is illustrated as further comprising user input processing engine 112. In examples, authoring application 108 uses user input processing engine 112 to enumerate available environment events for a 3D environment. For example, user input processing engine 112 may determine a set of available environment events based on a content item type (e.g., a video content item, an image content item, a 3D model content item, etc.). User input processing engine 112 is used by authoring application 108 to process user input events when an author is authoring the 3D environment, thereby enabling the author to interact with content items. Similarly, user input processing engine 112 is used by viewer application 110 to process user input events when an end user is viewing or interacting with the 3D environment. While user input processing engine 112 is illustrated as separate from authoring application 108 and viewer application 110, it will be appreciated that, in other examples, similar aspects are implemented by authoring application 108 and/or viewer application 110.

In some examples, authoring application 108 is a web-based application, wherein a computing device of a user (e.g., computing device 102 or computing device 104) may access authoring application 108 using a web browser. In other examples, authoring application 108 may be an executable application, which may be retrieved and executed by a user's computing device.

Viewer application 110 generates a 3D environment based on an environment data file to enable a user to view, explore, and/or interact with the 3D environment and content items located therein. In an example, viewer application 110 is a web-based application, wherein a computing device of a user (e.g., computing device 102 or computing device 104) accesses viewer application 110 using a web browser. In other examples, viewer application 110 may be an executable application, which may be retrieved and executed by a user's computing device. Viewer application 110 may populate the generated 3D environment with content items as specified by the environment data file.

Viewer application 110 uses user input processing engine 112 to process user input from one or more input devices when a user is exploring a 3D environment as described above. For example, input events received by viewer application 110 from one or more input devices are processed to generate associated environment events. A target content item for the user input is determined, such that a generated environment event is provided to the content item in the 3D environment accordingly.

Authored environment data store 114 stores one or more environment data files, as may be authored by authoring application 108. In some examples, an "environment data file" as is used herein is stored as a file on a file system, an entry in a database, or may be stored using any of a variety of other data storage techniques. In an example where authoring application 108 is a locally-executed application, at least a part of an authored environment data file may be received from one of computing devices 102 and 104, and stored using authored environment data store 114. In some examples, viewer application 110 retrieves an environment data file from authored environment data store 114, which, in conjunction with one or more content items and/or assets, may be used to generate a 3D environment. In an example where a viewer application is a locally-executed application, aspects of one or more asset containers may be stored local and/or remote to the device executing the application, and at least a part of an environment data file may be retrieved from authored environment data store 114. In some examples, the environment data file may be streamed or retrieved in chunks, so as to reduce bandwidth consumption and/or to improve responsiveness. It will be appreciated that other data storage and/or retrieval techniques may be used without departing from the spirit of this disclosure.

Applications 116 and 118 of computing devices 102 and 104, respectively, may be any of a variety of applications. In an example, application 116 and/or 118 is an authoring application as described above, wherein a user of computing device 102 and/or 104 may use the application to author a 3D environment described by an environment data file. In some examples, the environment data file is stored by authored environment data store 114. In another example, application 116 and/or 118 is a viewer application as described above, which may be used to view, render, and/or explore a 3D environment defined at least in part by an environment data file. In other examples, computing device 102 and/or 104 comprises an authored environment data store similar to authored environment data store 114. In instances where viewer application 110 is a web-based application, application 116 and/or 118 is a web browser that is used to access viewer application 110. In examples, one or more input devices and/or a hardware AR or VR device (not pictured) is attached to computing devices 102 and/or 104 and used to view and/or engage with a rendered 3D environment. For example, a VR or AR headset may be used.

Figure 2:
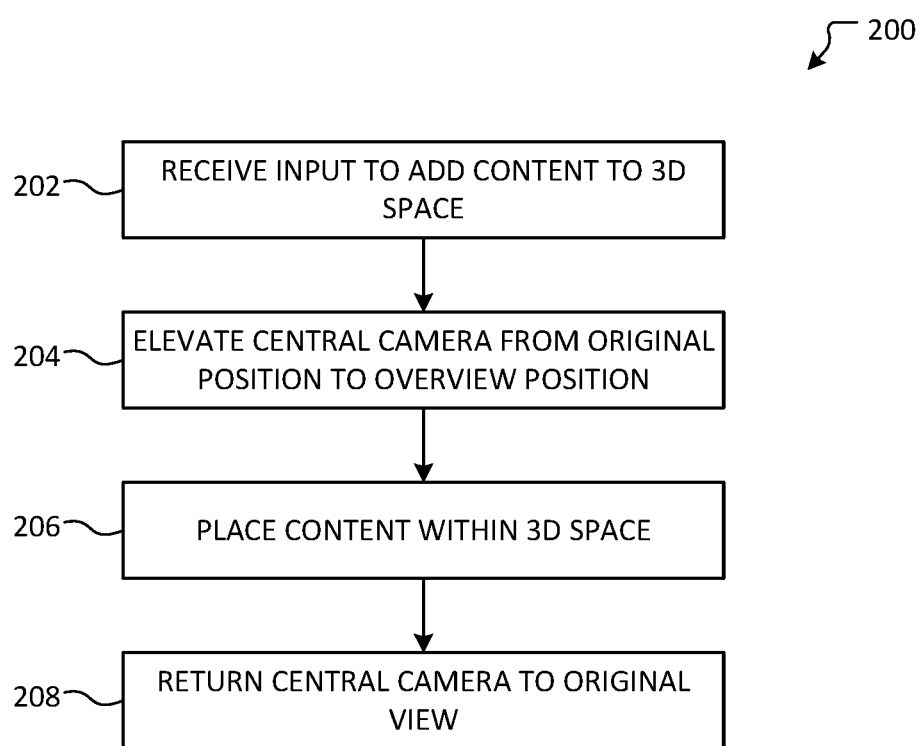
FIG. 2 illustrates an overview of an example method for performing an elevation change in a 3D environment as described herein.

FIG. 2 illustrates an example method for performing an elevation change in a 3D environment as described herein. In example method 200, a 3D environment has been created with an authoring component, such as authoring application 108, and presented via a 2D GUI. The created 3D environment includes at least a platter and a camera. The platter appears as a horizontal surface upon which content items can be placed. In certain aspects, the 3D environment additionally includes a background, which appears in a perpendicular orientation relative to the platter. The camera is centrally positioned within the platter and provides the view of the 3D environment. Example method 200 begins with operation 202, wherein an input is received to add content to the 3D environment. The input to add content may occur, for example, through a menu selection to add content or by selection of a placement location within the 3D environment. Additional inputs are contemplated.

At operation 204, based on receiving the input to add content to the 3D environment, the authoring component elevates the camera from a first height to a second height. In doing so, the angle of view provided by the camera is perceived to be maintained while the field of view provided by the camera is broadened. In certain aspects, the authoring component need only receive the input to add content in order to automatically elevate the camera to the second height. In certain aspects the second height is a predetermined height while in other aspects the second height is calculated based on the first height. Other second height determinations are also contemplated. The elevated second height provides a broader view of the existing content of the platter. The elevated, broader view of the platter may enable the author to better determine a desired placement of the new content.

In certain aspects, the perceived angle of view provided by the camera may be maintained by:

(a) selecting a target radius on the platter relative to the central position of the camera (e.g. TR=a target radius;

(b) determining the forward direction of the camera by removing/ignoring the pitch of the camera, e.g. removing the up/down pivot angle, θ=0, of the camera (e.g., fp=camera's forward direction vector);

(c) determining a unit vector for the target radius with the camera pitch removed (e.g. dfp=toUnitVector (fp.x, 0, fp.z), where dfp is the unit vector of the vector created by zeroing out the y-coordinate of fp); and (d) multiplying the unit vector by the target radius to obtain a positioning vector in the X-Z plane for the camera at the predetermined elevated overview height resulting in the elevated camera with the same focal point as the camera at its original height (e.g., T=dfp*TR)

The target radius determines where on the on the platter the camera is pointed as the camera is elevated. The target radius is a constant chosen such that the camera is looking at an intermediate location relative to the center and edge of the platter. As such, the target radius is not chosen to be at the far edge of the platter and is not chosen to be at the very center of the platter.

The maintenance of the perceived angle of view provided by the camera, provides a broadened overview of the platter that may show more content items previously placed on the platter. Without maintaining the perceived angle of view while elevating the camera but rather maintaining the original angle of view provided by the camera at the first height, the portion of the platter seen by the camera would actually decrease.

Continuing with method 200, at operation 206, the content is placed within the 3D environment with the benefit of seeing a greater portion of the platter provided through the broadened overview. In certain aspects, the content is placed at a location point on the platter that is selected by the author while in other aspects the authoring component automatically determines a placement location for the content. Additional manners of determining content placement are contemplated.

At operation 208, based upon placement of content within the 3D environment, the camera is returned to the first height within the 3D environment while the perceived angle of view provided by the camera is maintained in the same manner described above. In certain aspects, the camera is automatically returned to the first height based only upon placement of the content within the 3D environment. In certain aspects, multiple content items are placed prior to returning the camera to the first height. In certain aspects, the camera may be returned to the first height in response to inputs other than content placement. Such an input may include, for example, a menu selection to return the camera to the first height or exiting a certain operational mode of the authoring component, though other inputs are also possible.

Figure 3A:
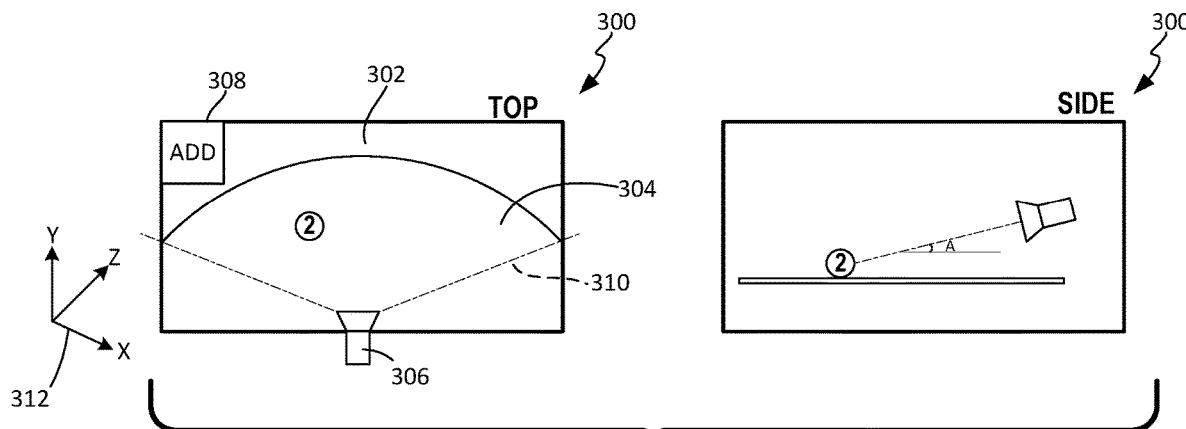
FIGS. 3A-3C illustrate example views of a 2D graphical user interface (GUI) of an authoring application during execution of the method for performing an elevation change in a 3D environment as described herein.
Figure 3B:
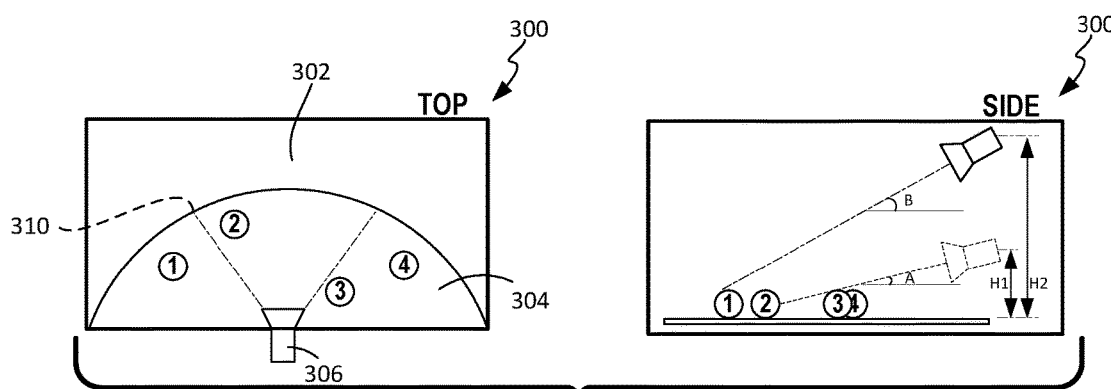
Figure 3C:
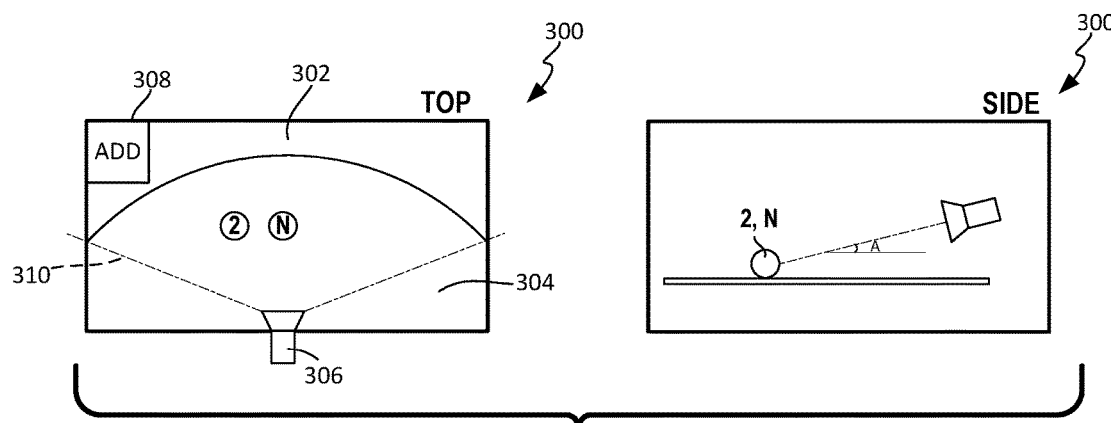

FIGS. 3A-3C provide example top and side views of a 2D graphical user interface (GUI) of authoring application 108 during execution of the method of FIG. 2. FIG. 3A illustrates a 3D environment displayed in a 2D GUI 300 of authoring application 108. The 3D environment includes a background 302, a platter 304 and a camera 306; other elements of the 3D environment may also be present. The platter 304 presents a surface upon which content items may be placed. In certain aspects, the surface may be a flat surface while in other aspects the surface may be uneven. In certain aspects, the platter 304 is in a horizontal orientation, however, the platter 304 may also be presented in other orientations. The background 302 extends about the platter. In certain aspects, the background 302 is in a perpendicular orientation to the platter 304. In certain aspects, placement of content items on the background 302 is prohibited while in other aspects placement of content items on the background is permitted. Camera 306 is centrally positioned within platter 304 at a first height H1. In certain aspects, the camera 306 is at a fixed position relative to first and second axes (e.g., X-Z axes) of the 3D environment with an ability to translate (e.g., move from to location to location) along a third axis, e.g. Y-axis of the 3D environment as well as rotate 360 degrees about its fixed position. As illustrated in the side view of FIG. 3A, the camera is presented at an angle A to produce the view seen in the top view of FIG. 3A. In FIGS. 3A-3C, camera 306 is provided as a positional reference for the view depicted in the 2D GUI 300 and is typically not displayed in the actual 2D GUI. FIG. 3A additionally includes an option 308 to "add" content as well as existing content 2. A field of view 310 of camera 306 at its current elevation, the first height H1, is indicated by dashed lines. A 3D Cartesian coordinate system 312 comprising X-Y-Z axes is provided as reference.

FIG. 3B illustrates 2D GUI 300 as it appears in response to receiving a selection of "add" content option 308 in FIG. 3A. As shown, camera 306 has been elevated to an overview height, a second height H2, providing a broadened view of platter 304, as indicated by the additional visible content items 1, 3 and 4. The perceived angle of view has remained the same for the viewer, however, the actual angle of the camera 306, now presented at angle B, has changed in accordance with the method (items (a)-(d)) described above.

FIG. 3C illustrates 2D GUI 300 as it appears immediately subsequent addition of new content, N, to the platter 304. As shown, the camera 306 has returned to its original height with its original focal point 310 maintained.

Figure 4:
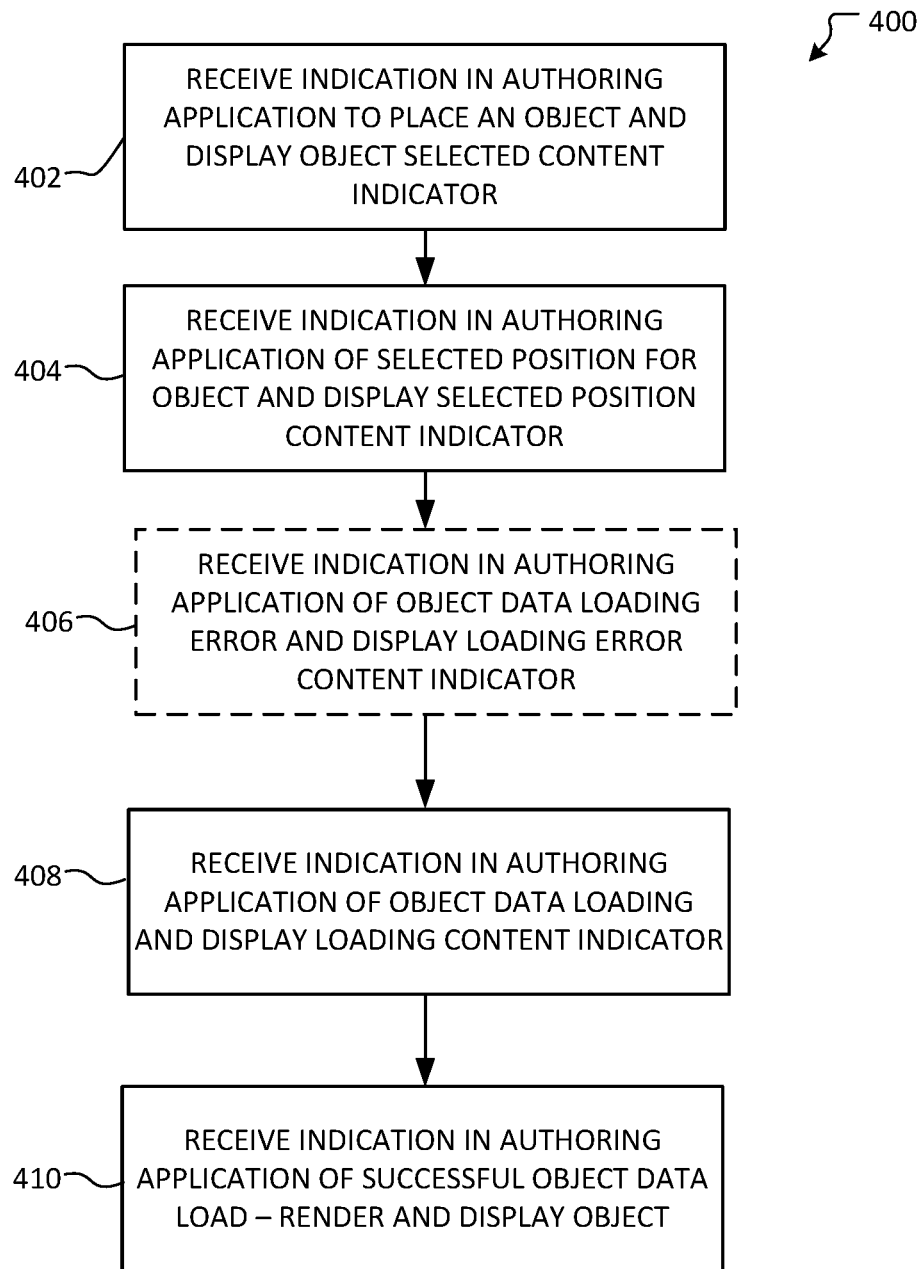
FIG. 4 illustrates an example method for displaying and a content indicator of a 3D object in a 3D environment as described herein.

FIG. 4 illustrates an example method 400 for displaying a content indicator, in a 2D format, representative of a loading object. In the method 400, a plurality of content indicators in a 2D format are utilized to provide the user with an updated status of loading content (the same content indicators can be used for the loading of both 2D objects and 3D objects).

Figure 5A:
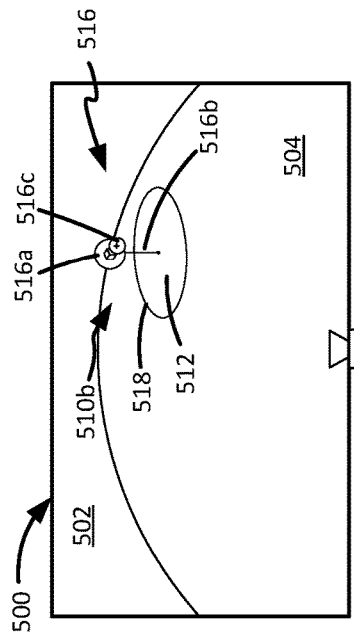
FIGS. 5A-5G illustrates example views of a 2D GUI of an authoring application displaying content indicators and objects as described herein.

Referring to FIG. 4, the example method 400 for displaying content indicators begins at operation 402, where the authoring application 108 receives an indication to load an object (e.g., a 2D or 3D object) into the 3D environment viewable within the 2D GUI of the authoring application and displays a corresponding object selected content indicator. FIG. 5A illustrates the objected selected content indicator 510(a) in a 3D environment within a 2D GUI 500 of the authoring application 108. The 3D environment includes a background 502, a platter 504 and a camera 506; other elements of the 3D environment may also be present (see additional description of a 3D environment with respect to FIGS. 3A-3C). The object selected content indicator 510(a) indicates an object status that the author has selected an object (e.g., a webpart). The object selected content indicator 510(a) is associated with a user's cursor such that the object selected content indicator 510(a) is movable about the platter 504. In certain aspects, the object selected content indicator 510(*a*) can include a shadow indicator 512 parallel to the platter 504 that identifies a placement position of an object, a dashed line 514 about the shadow indicator, and a center position indicator 516, in this instance in the form of a 2D cube call-out 516(*a*) with an extending center line 516(*b*).

Figure 5B:
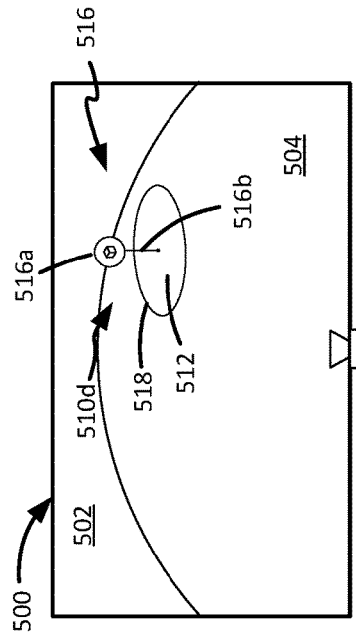

Referring again to FIG. 4, method 400 continues with operation 404 wherein the authoring application has received an indication of a selected position in which to place the object and displays a selected position content indicator. FIG. 5B illustrates a selected position content indicator 510(*b*) that indicates an object status of a selected position. The selected position content indicator 510(*b*) is now stationary at the selected position. In certain aspects the 2D selected position content indicator 510(*b*) includes the shadow indicator 512 that identifies the placement position of an object, a solid line 518 about the shadow indicator 512, the center position indicator 516, in this instance in the form of a cube call-out 516(*a*) with an extending center line 516(*b*), as well as encircled plus (+) sign. In the context of the display of the selected position content indicator 510(*b*) data (e.g. a 2D or 3D model file) has not yet populated at the selected position.

Figure 5D:
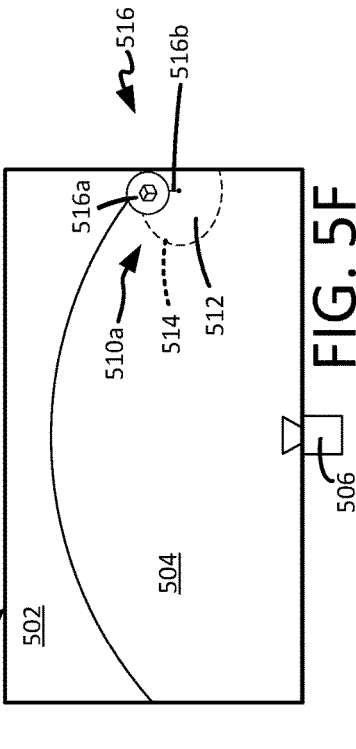
Figure 5C:
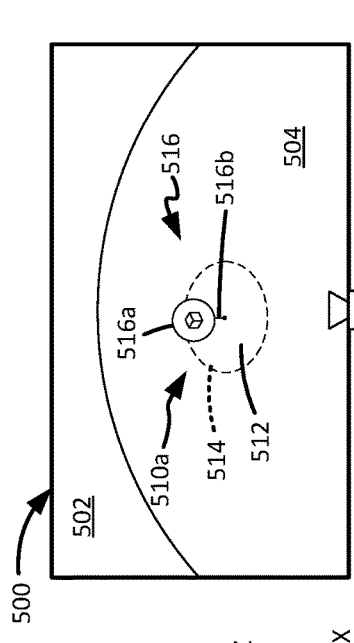

Referring again to FIG. 4, method 400 may continue with operation 406 wherein the authoring application has selected and placed an object with the 3D environment and has additionally attempted to load the data to populate the object but has received an indication that an error in loading the data has occurred. Responsive to the indication of the error, the authoring application displays a loading error content indicator. FIG. 5C illustrates a loading error content indicator 510(*c*) that indicates an object status of error in loading. The loading error content indicator 510(*c*) remains stationary in the selected position. In certain aspects the loading error content indicator 510(*c*) includes the shadow indicator 512 that identifies the placement position of the object, the solid line 518 about the shadow indicator 512, and the center position indicator 516, in this instance in the form of the 2D cube call-out 516(*a*) with the extending center line 516(*b*); other indicators are contemplated. The loading error content indicator 510(*c*) additionally includes an error indication 516(*d*). In this instance an encircled letter X provides the error indication; other error indications are contemplated.

Referring again to FIG. 4, method 400 continues with operation 408 in the instance that an error in data loading of the object has not occurred. In operation 408, the authoring application has received an indication that the data to populate the object is being received successfully and displays a loading content indicator. FIG. 5D illustrates a loading content indicator 510(*d*) that indicates an object status of data loading. The loading content indicator 510(*d*) remains stationary in the selected position. In certain aspects the loading content indicator 510(*d*) includes the shadow indicator 512 that identifies the placement position of the object, the solid line 518 about the shadow indicator 512, and the center position indicator 516, in this instance in the form of the 2D cube call-out 516(*a*) with the extending center line 516(*b*). Further, in certain aspects, the loading content indicator 510(*d*) includes a visual indicator applied to a portion of, or the entirety of, of the loading content indicator 510(*d*) to indicate active loading. Examples of visual indicators can include but are not limited to color changes, graphical effects (e.g., shimmering, blinking, etc.) or text.

Figure 5E:
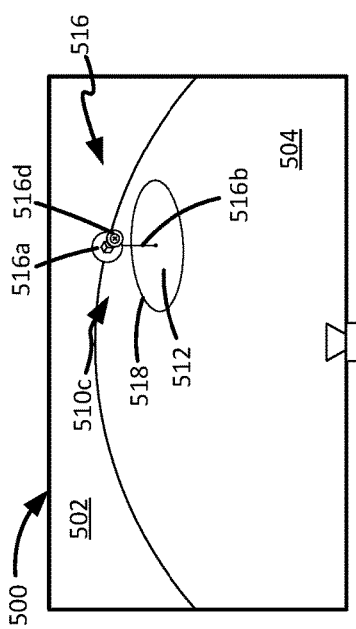

Referring to FIG. 4, method 400 continues with operation 410 wherein the authoring application receives an indication that the data for the selected object in its selected position has loaded successfully. Responsive to the indication, the authoring application removes the content indicator 510(*d*) and, renders and displays the object itself at the selected position. FIG. 5E illustrates the loaded object 520 in the GUI 500 of the authoring application.

Figure 5F:
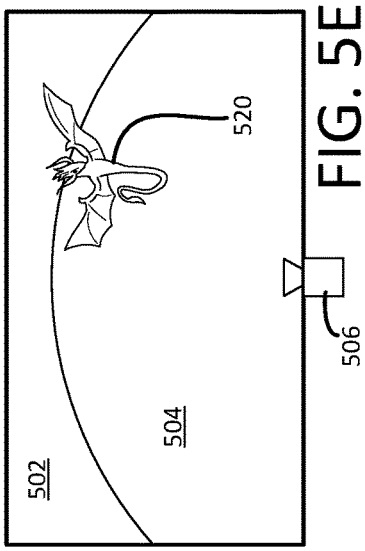
Figure 5G:
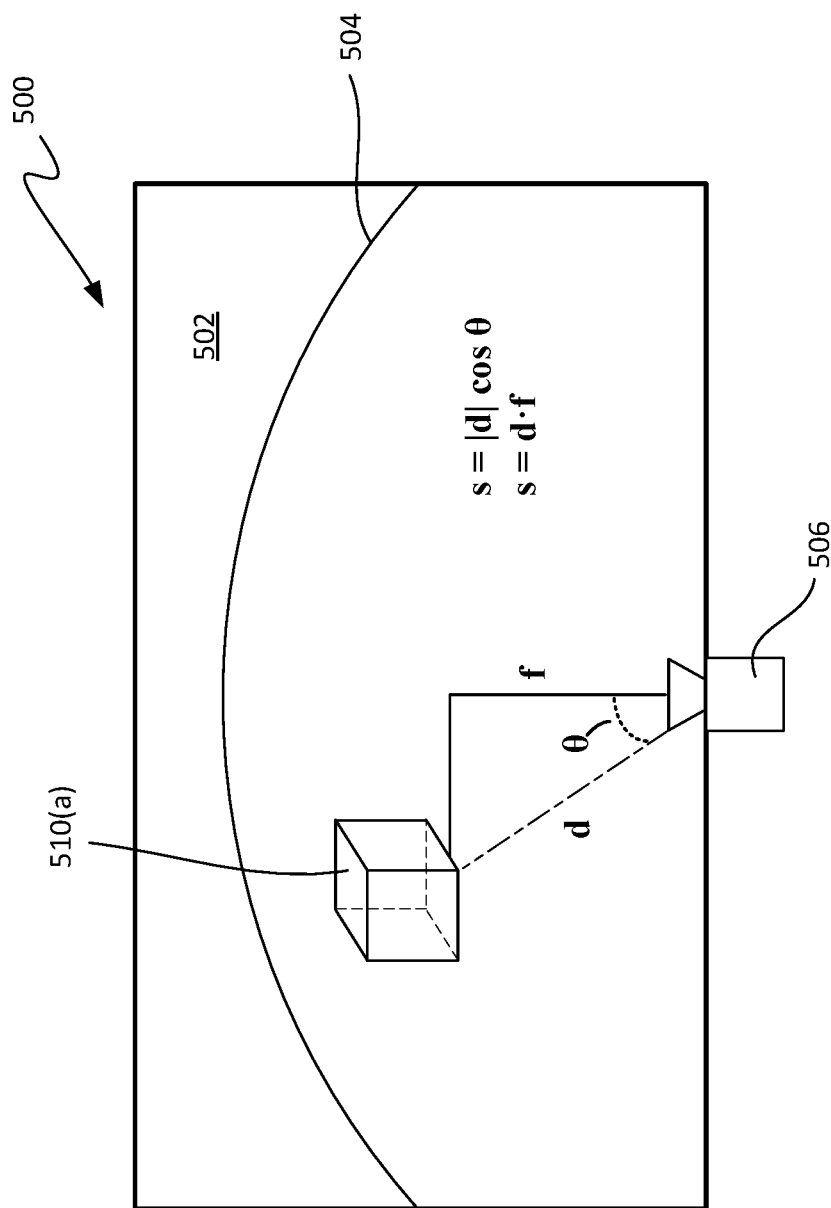

FIG. 5F illustrates a context in which the content indicator 510(*a*) is at an extreme right position within the view of the 3D environment of the 2D GUI 500 of the authoring application 108. To prevent distortion that can occur in the display of the content indicator 510(*a*) (or other content indicators), the content indicator 510(*a*) is scaled to always appear within the 3D environment of the 2D GUI 500 at a uniform size and angle independent of distance from the camera 506 in a 3D environment. In certain aspects, the scaling of the content indicator 510(*a*) is performed only on the center position indicator 516 (the shadow indicator 512 and dashed line are not scaled) while in other aspects all element of the content indicator 510(*a*) are performed. Scaling of the content indicator 510(*a*) by the authoring application includes, with reference to FIG. 5G, the following:

(a) letting d=a vector pointing from the camera 506 to the content indicator 508, which is equivalent to the position vector of the content indicator 508 minus the position vector of the camera 506;

(b) letting f=a forward direction vector of the camera 506; and (c) calculating s to be a scalar projection of d onto f (s=d·f, wherein · is the dot-product (a.k.a inner product) operator.

Note s=d·f can also be expressed as s=|d| cos θ, where |d| is the length of d and θ is the angle between d and f. The above-noted process scales the content indicator 510 (*a*) as if it is always on a straight line extending forward from the camera 506. In this manner, horizontal movements of the content indicator do not change its scale, which helps to overcome distortion of the content indicator when displayed near the edges of the display screen.

Scaling enables an author of a 3D environment to use an authoring application, such as authoring application 108, to move a content indicator about a screen view, even at an edge of the screen view, within the 2D GUI of the authoring application without distortion the content indicator.

Figure 6:
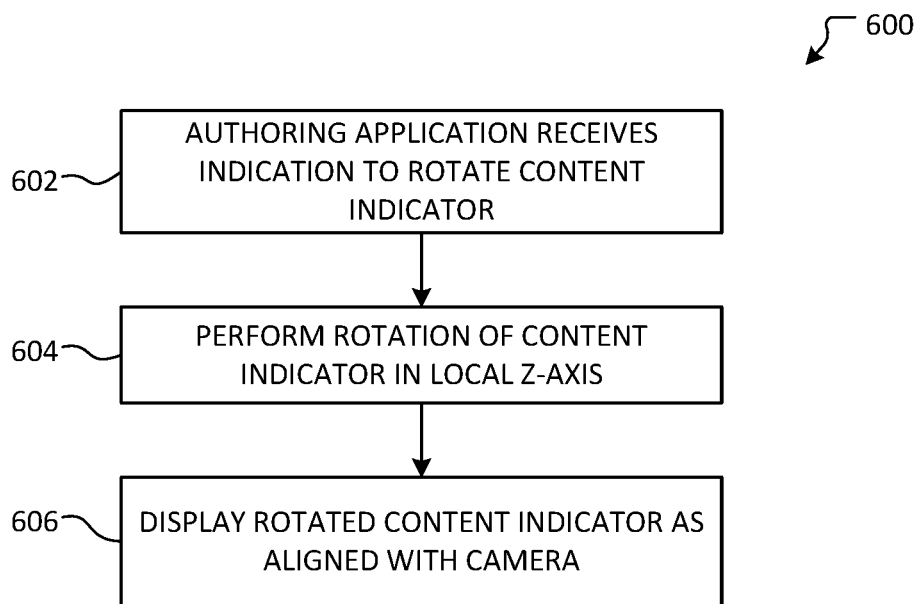
FIG. 6 illustrates an example method for rotating content indicators within a 3D environment of a 2D GUI of an authoring application as described herein.

FIG. 6 illustrates an example method 600 for rotating a content indicator, such as content indicator 510(*a*) in FIG. 5E, when appearing at an edge of the display screen within a 3D environment displayed within a 2D GUI of an authoring application. Example method 600 begins with operation 602 wherein the authoring application receives an indication to rotate the content indicator.

At operation 604, responsive to the indication to rotate, the authoring component determines that the content indicator should be rotated in its local Z-axis so that the content indicator remains flush with the side of the display screen and performs this rotation by using the upward direction/vector of the camera and a forward vector. More specifically, the content indicator is rotated in its local Z-axis to align with the camera forward vector.

Figure 7:
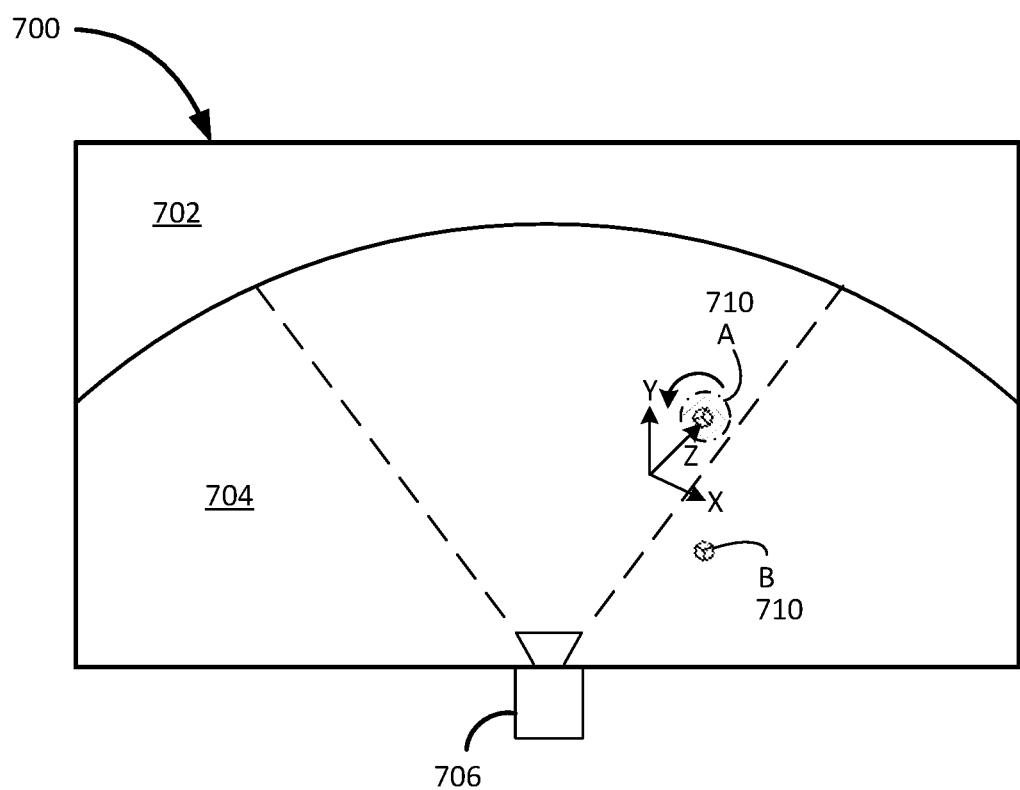
FIG. 7 illustrates an example view of a 2D GUI of an authoring application during execution of the method for rotating content indicators as described herein.

FIG. 7 illustrates a 3D environment displayed in a 2D GUI 700 of the authoring application 108. The 3D environment includes a platter 702, a background 704 and a camera 706 (see additional description of a 3D environment with respect to FIGS. 3A-3C). FIG. 7 additionally illustrates a content indicator 710 at a position A prior to rotation about its Z-axis and at a position B subsequent to rotation about its Z-axis to align with the upward vector of the camera 706.

In certain aspects, the upward direction/vector of the camera may be determined by supplying one or more parameters to a method or function in a code library associated with the camera object in the 3D environment. As a specific example, the upward direction (or relative upward displacement) of the camera may be determined using a method (such as camera.getDirection) that returns the direction of the camera relative to a given local axis. In such as example, camera.getDirection may be a method in a 3D graphics engine, such as Babylon.js. The forward vector may also be determined by supplying one or more parameters to a method or function in the code library. As a specific example, the forward vector may be determined using a method that subtracts the position of the content indicator in the 3D environment from the position of the camera. Upon determining the upward direction of the camera and the forward vector, the upward direction and forward vector may be used to the content indicator. As a specific example, the upward direction and forward vector may be provided to a method or function in the code library. The method may output a value used to orient the content indicator towards the camera.

Referring to FIG. 6, at operation 606 of method 600, the authoring application displays the rotated content indicator as aligned with the camera.

Figure 8:
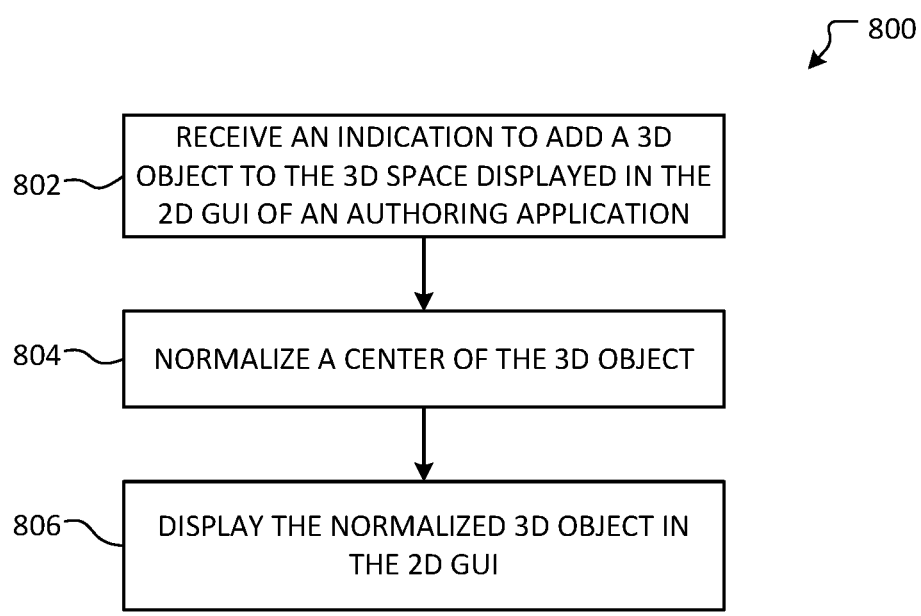
FIG. 8 illustrates an example method for normalizing 3D objects in a 3D environment as described herein.

FIG. 8 provides an example method 800 for normalizing 3D objects within a 3D environment. As described elsewhere herein, an authoring component, such as authoring application 108, is configured to access 3D objects created and implemented in various 3D environments. In many aspects, the 3D objects have been created using various drawing/authoring tools or applications. Moreover, the 3D objects have been implemented/placed in their respective 3D environments such that the 3D objects may not be the center of their environments. For example, an object may be placed and oriented within an environment with respect to a location or a different object within the environment. In such an example, the point upon which the object is centered (e.g., the offset center), may be outside the boundaries, e.g. a bounding box, of the object. As a result, when the object is subsequently loaded into an environment in which the object was not originally created, the object may be aligned in the new environment according to the point upon which the object was previously centered. Additionally, when the object is subsequently loaded into an environment in which the object was not originally created, the object may retain a scaling factor or dimensions of the previous environment.

The authoring component normalizes the loaded 3D object. In certain aspects, the center of the loaded 3D object may be normalized to reposition the center of the 3D object to a newly calculated center that replaces the offset center. Normalizing the center of the 3D object enables the 3D object to be loaded at a selected location and in a desired orientation, e.g. a forward facing orientation, within the 3D environment. As another example, the size of the loaded 3D object may be normalized to prevent illegible, unsightly, or unwieldly zoom perspectives while in an Inspection Mode. Inspection Mode within the authoring tool enables a user to inspect a 3D object by moving the loaded 3D object into a closer view that depicts the 3D object in greater detail. Normalizing a 3D object for the Inspection Mode allows users to view virtually any object at close range because the 3D object has been adjusted to a size suitable for the close range view.

Example method 800 begins with operation 802, where the authoring component has received an indication to add a 3D object to the 3D environment displayed in the 2D GUI of the authoring component. The indication to add the 3D object may be generated, for example, through a menu selection to add content or by selecting a placement location within the 3D environment; other inputs are also possible.

At operation 804, the authoring application normalizes the center of the 3D object by:

(a) removing an existing offset center and existing rotation point of the 3D object;

(b) measuring visible vertices of the 3D object based on the positions of the visible vertices within the 3D environment;

(c) determining and assigning a new bounding box that completely encompasses the 3D object based on the measured visible vertices of the 3D object by finding a maximum X, Y, and Z-position and a minimum X, Y, and Z-position in the 3D environment based on the measured visible vertices and using those positions to generate a box for bounds;

(d) determining a center of the bounding box and assigning a new rotation point at the determined center (the center/rotation point is determined at the midpoint between the maximum and minimum X, Y, and Z-positions from operation (c) and the center/rotation point is set as the vector that is used for scaling, rotation and translation of the 3D object); and (e) scaling the new bounding box, 3D object and new rotation point to fill a unit cube. In the instance that the 3D object to be added is oversized or undersized for the current 3D environment, the scaling of the 3D object to a unit cube ensures that the 3D object is reduced or enlarged, respectively, to a size suitable for the current 3D environment.

In certain aspects, normalization of the 3D object additionally includes orienting the 3D object so that a front of the 3D object is facing towards the camera. Normalizing for a front face orientation is performed by analyzing an initial orientation of the 3D object along with initial dimensions of the 3D object then applying artificial intelligence (AI) to assign the front face to 3D object.

At operation 806, the authoring application 108 displays the normalized 3D object within the 3D environment displayed in the 2D GUI of the authoring application. The 3D object is displayed with the determined center of the 3D positioned at the location selected by the author and is oriented such that a designated front of the 3D object faces the camera.

Figure 9A:
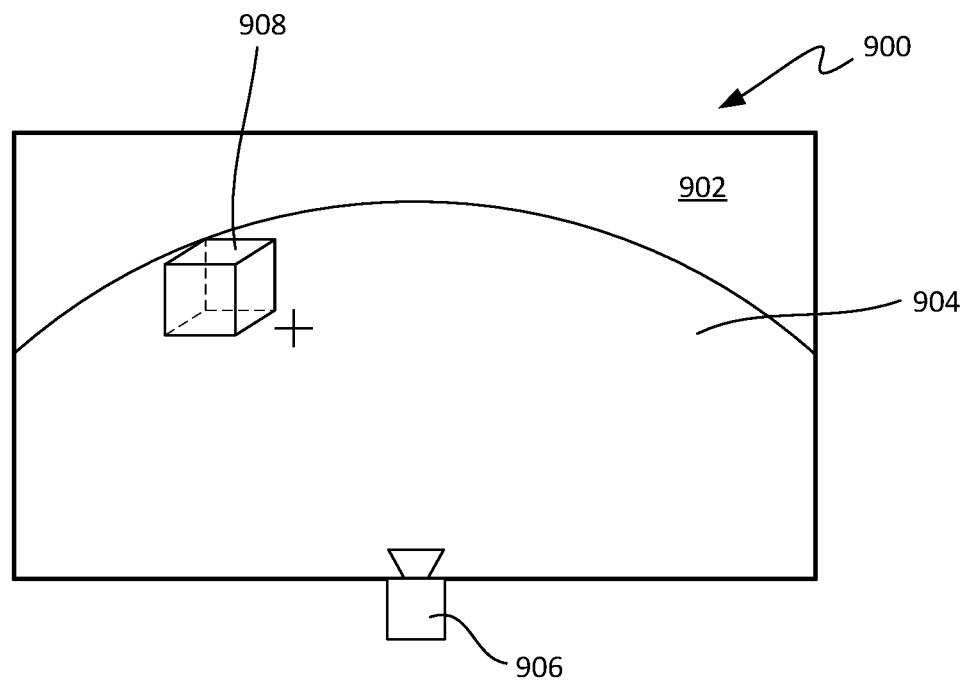
FIGS. 9A and 9B illustrate example views of a 2D GUI of an authoring application illustrating placement of a 3D object prior to normalization and after normalization, respectively, in a 3D environment described herein.
Figure 9B:
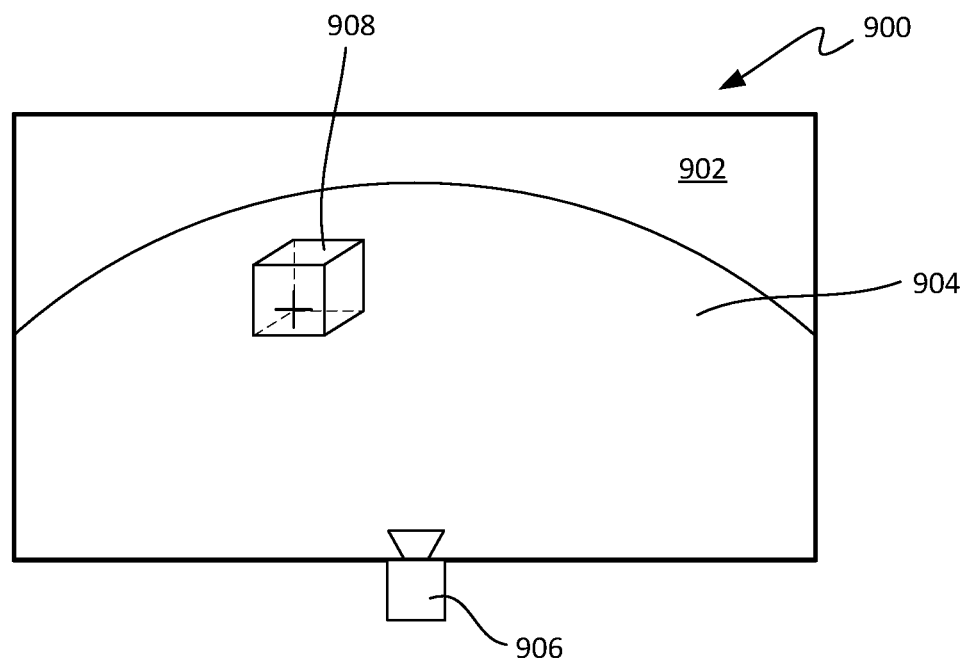

FIGS. 9A-9B provide example views of a 2D GUI prior to normalization of a 3D object placed within a 3D environment and after normalization of the 3D object.

FIGS. 9A-9B illustrate a 2D GUI 900 of the authoring application 108 displaying a 3D environment that includes a background 902, a platter 904 and a camera 906 centrally positioned within the platter 904. Each of FIGS. 9A and 9B also includes a 3D object 908 that has been loaded within the 3D environment. In FIG. 9A, 3D object 908 has been loaded without normalization of its center, which is offset to the lower right and outside of object 908. The originally assigned offset center of 3D object 908 in FIG. 9A has resulted in the offset center being positioned at the author's selected location within the 3D environment, the selection location being marked with a "+". As such, the 3D object is not presented in a position that the author was expecting.

FIG. 9B illustrates the 3D object 908 in a normalized state (e.g., normalized according to example method 800) where the newly assigned center/rotation point resides at a determined actual center of the 3D object 908 rather than the originally assigned offset center. Accordingly, the new center of the 3D object has positioned at the author's selected location within the 3D environment, the selection marked with the same "+" of FIG. 9A, and appear in an orientation and position that the author expected.

Figure 10:
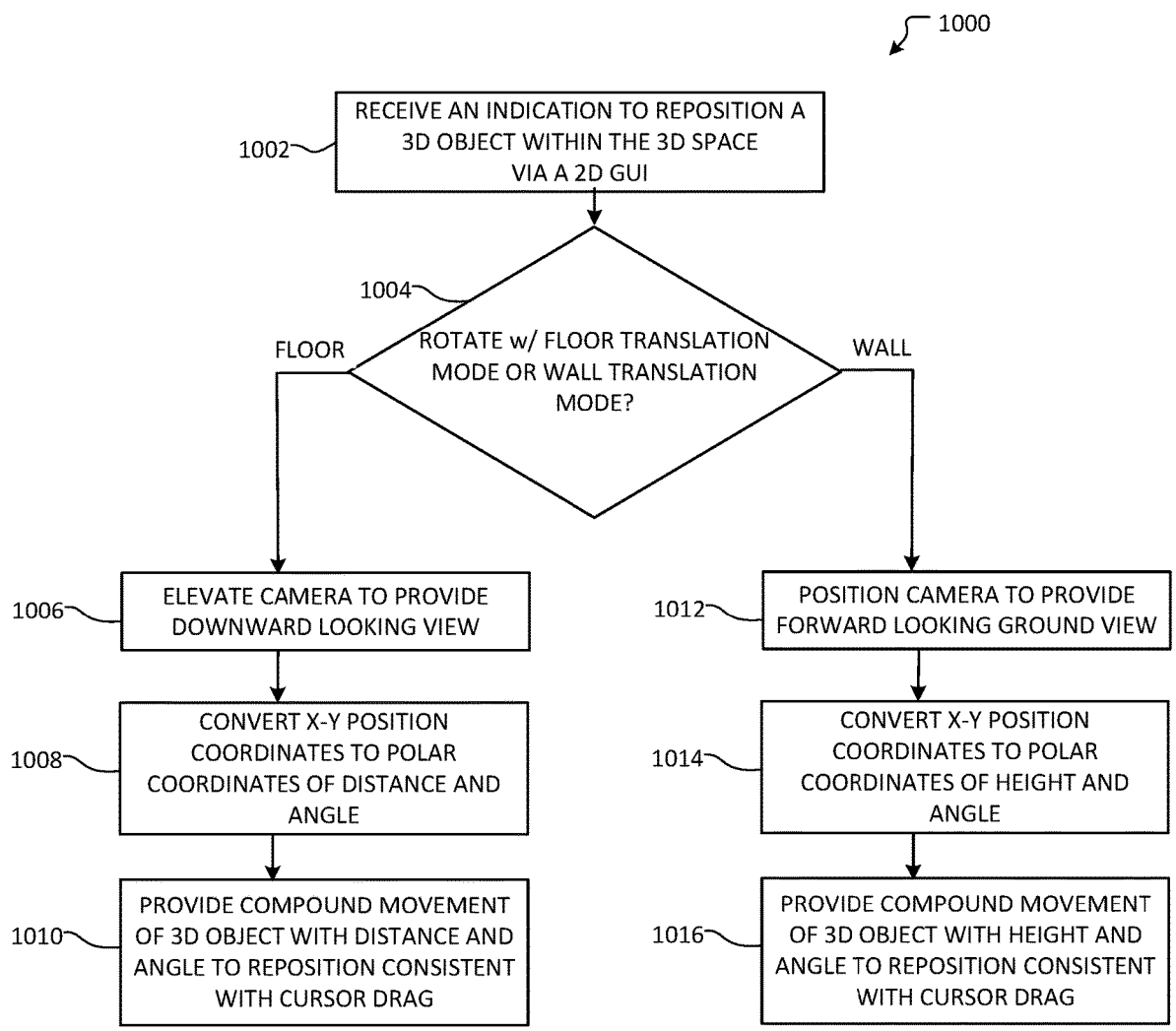
FIG. 10 illustrates an example method for rotating 3D objects in a 3D environment as described herein.

FIG. 10 provides an overview of an example method 1000 for rotating 3D objects in a 3D environment. Example method 1000 begins at operation 1002 where the authoring application has received an indication that an author wishes to reposition a 3D object within the 3D environment displayed in the 2D GUI of authoring application 108. The indication to add the 3D object may be generated, for example, through a menu selection to add content or by selecting a placement location within the 3D environment; other manners of generating the indication are also possible.

At operation 1004, authoring component presents the author with the option of repositioning the 3D object through use of a floor translation mode or wall translation mode. The floor translation mode maintains the 3D object at its current height relative to the platter while allowing the 3D object to rotate about its rotation point, which is often the center point of the 3D object, to a desired angle. While maintaining the 3D object at its current height, the floor translation mode also allows the 3D object to translate left or right and forward or back as desired. As such, the 3D object appears to be moving across the surface of the platter (e.g., across the "floor" of the 3D environment). The wall translation mode maintains the 3D object at its current position. For example, the 3D object is not allowed to translate left or right and forward or backward. While maintaining the 3D object at its current position, the wall translation mode allows the 3D object to translate upward and downward along an axis that is perpendicular to the platter and also allows the 3D object to rotate about this same axis. As such, the 3D object appears to be moving vertically relative to the platter (e.g. moving up and down an invisible "wall" that is perpendicular to the platter).

Upon selection of the floor translation mode, example method 1000 progresses to operation 1006. At operation 1006 the camera of the authoring application is elevated in height to provide a downward looking view of the platter on which the 3D object is currently positioned.

At operation 1008, the 3D object may be selected and maneuvered about the platter of the 3D environment using one or more input mechanisms. In doing so, the X-Y Cartesian coordinates of the 3D object being maneuvered about the platter are converted by the authoring application 108 into two of three parameters of a polar coordinate system (e.g., angle, distance and height). Specifically, the X-Y Cartesian coordinates of the cursor are translated to polar coordinates of distance and angle while the third polar coordinate, height, is held constant.

At operation 1010, maneuvering the 3D object results in a compound movement of the 3D object in distance and angle across the platter. The compound movement (e.g. simultaneous movement in the two dimensions of distance and angle) simplifies the translation of the 3D object by eliminating the need to move the 3D object along each axis in a Cartesian coordinate system with a separate action.

Upon selection of the wall translation mode, the example method 1000 progresses to operation 1012, wherein the camera of the authoring application is positioned at a ground (e.g. platter) elevation to provide a forward looking view of the 3D environment.

At operation 1014, the 3D object may be selected and maneuvered relative the background (the background is generally positioned perpendicular to the platter as a wall is perpendicular to a floor) of the 3D environment using one or more input mechanisms. In doing so, the X-Y Cartesian coordinates of the 3D object being maneuvered are translated by the authoring application 108 into two of three parameters of a polar coordinate system (e.g., angle, distance and height). Specifically, the X-Y Cartesian coordinates of the cursor are translated to polar coordinates of height and angle while the third polar coordinate, distance, is held constant.

At operation 1016, the maneuvering of the 3D object results in a compound movement of the 3D object in height and angle relative the background. The compound movement (e.g. simultaneous movement in the two dimensions of height and angle) simplifies the translation of the 3D object by eliminating the need to move the 3D object along each axis in a Cartesian coordinate system with a separate action.

Figure 11A:
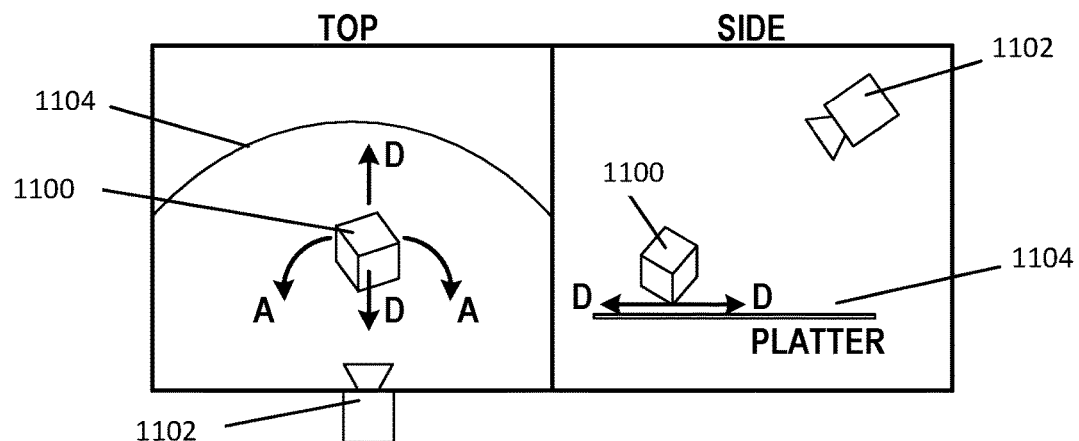
FIGS. 11A and 11B illustrate the compound translations of a floor translation mode and a wall translation mode, respectively, when rotating a 3D object in a 3D environment as described herein.

FIG. 11A illustrates the compound translations of a 3D object 1100 during floor translation mode from both a top of view of the 3D environment and a side view of the 3D environment displayed within the 2D GUI of the authoring application 108 of the present disclosure. As shown, the 3D object has an adjustable angle A and an adjustable distance D. The position of camera 1102 relative to the 3D object 1100 and the platter 1104 of the 3D environment is also shown.

Figure 11B:
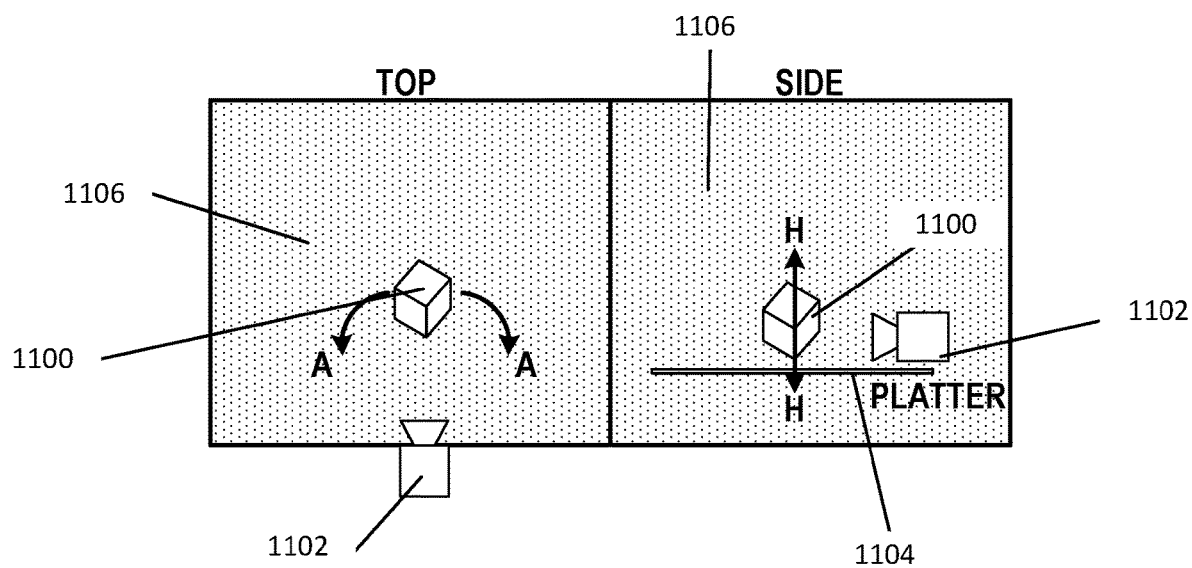

FIG. 11B illustrates the compound translations of a 3D object during wall translation mode from both a top of view of the 3D environment and a side view of the 3D environment displayed within the 2D GUI of the authoring application 108 of the present disclosure. As shown, the 3D object has an adjustable angle A and an adjustable height H. The position of the camera 1102 relative to the 3D object 1100, the platter 1104 and the background 1106 of the 3D environment is also shown.

FIGS. 12-15 and the associated descriptions provide a discussion of a variety of operating environments in which aspects of the disclosure may be practiced. However, the devices and systems illustrated and discussed with respect to FIGS. 12-15 are for purposes of example and illustration and are not limiting of a vast number of computing device configurations that may be utilized for practicing aspects of the disclosure, described herein.

Figure 12:
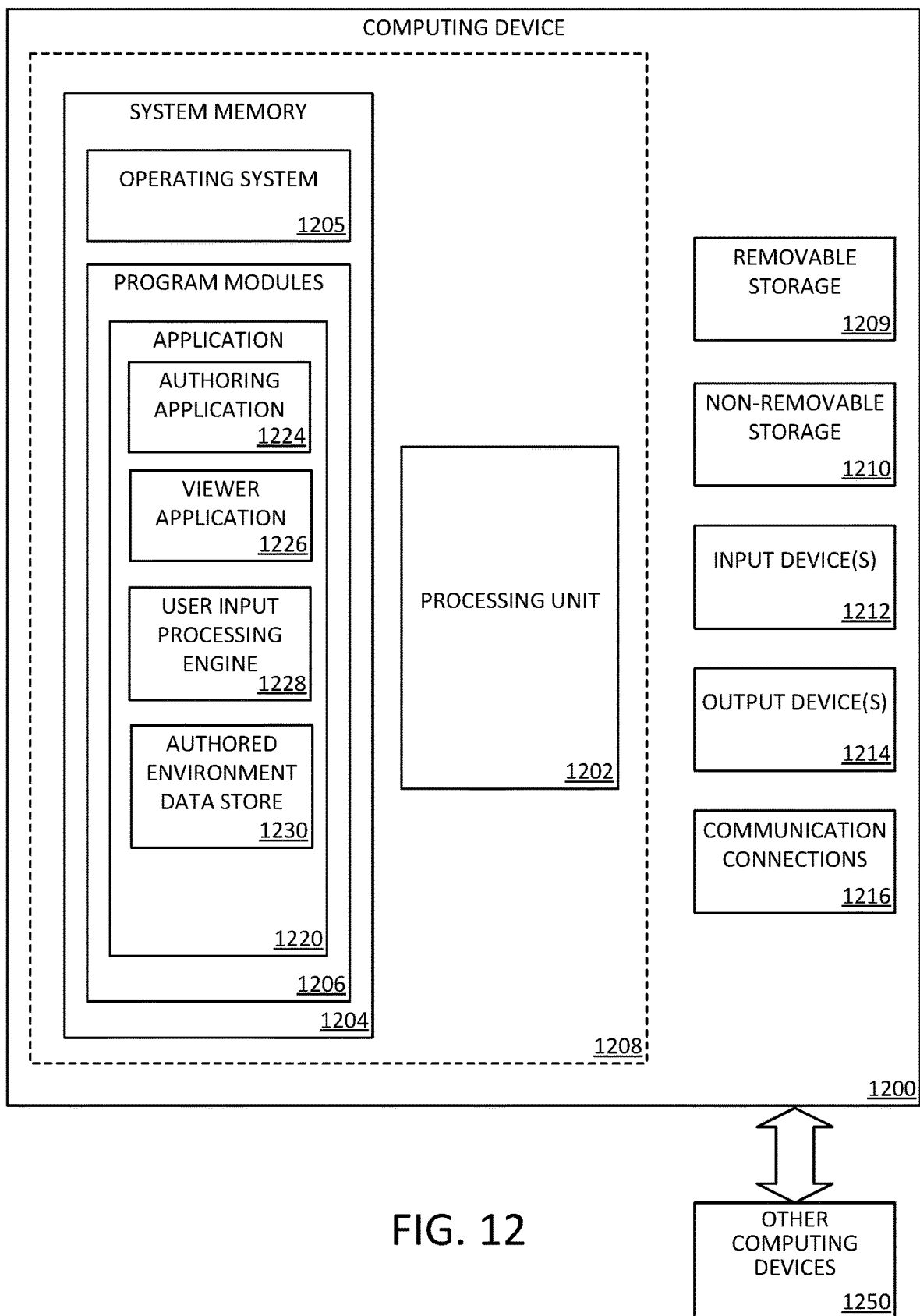
FIG. 12 is a block diagram illustrating example physical components of a computing device with which aspects of the disclosure may be practiced.

FIG. 12 is a block diagram illustrating physical components (e.g., hardware) of a computing device 1200 with which aspects of the disclosure may be practiced. The computing device components described below may be suitable for the computing devices described above, including the computing devices 102 and 104 and the 3D environment service 106. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories.

The system memory 1204 may include an operating system 1205 and one or more program modules 1206 suitable for running software application 1220, such as one or more components supported by the systems described herein. As examples, system memory 1204 may include an authoring application 1224, a viewer application 1226, a user input processing engine 1228 and an authored environment data store 1230. The operating system 1205, for example, may be suitable for controlling the operation of the computing device 1200.

Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., application 1220) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13A:
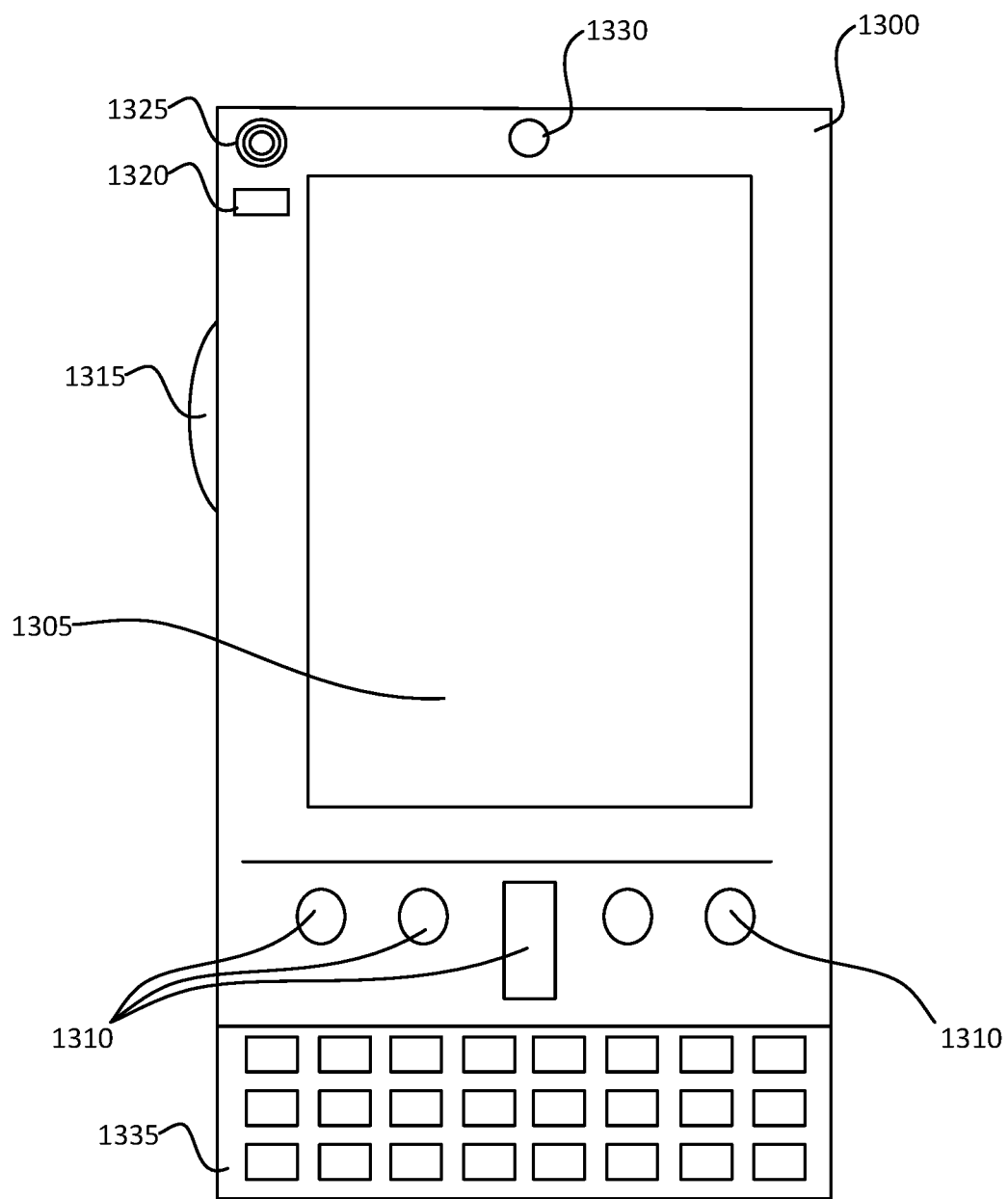
FIGS. 13A and 13B are simplified block diagrams of a mobile computing device with which aspects of the present disclosure may be practiced.
Figure 13B:
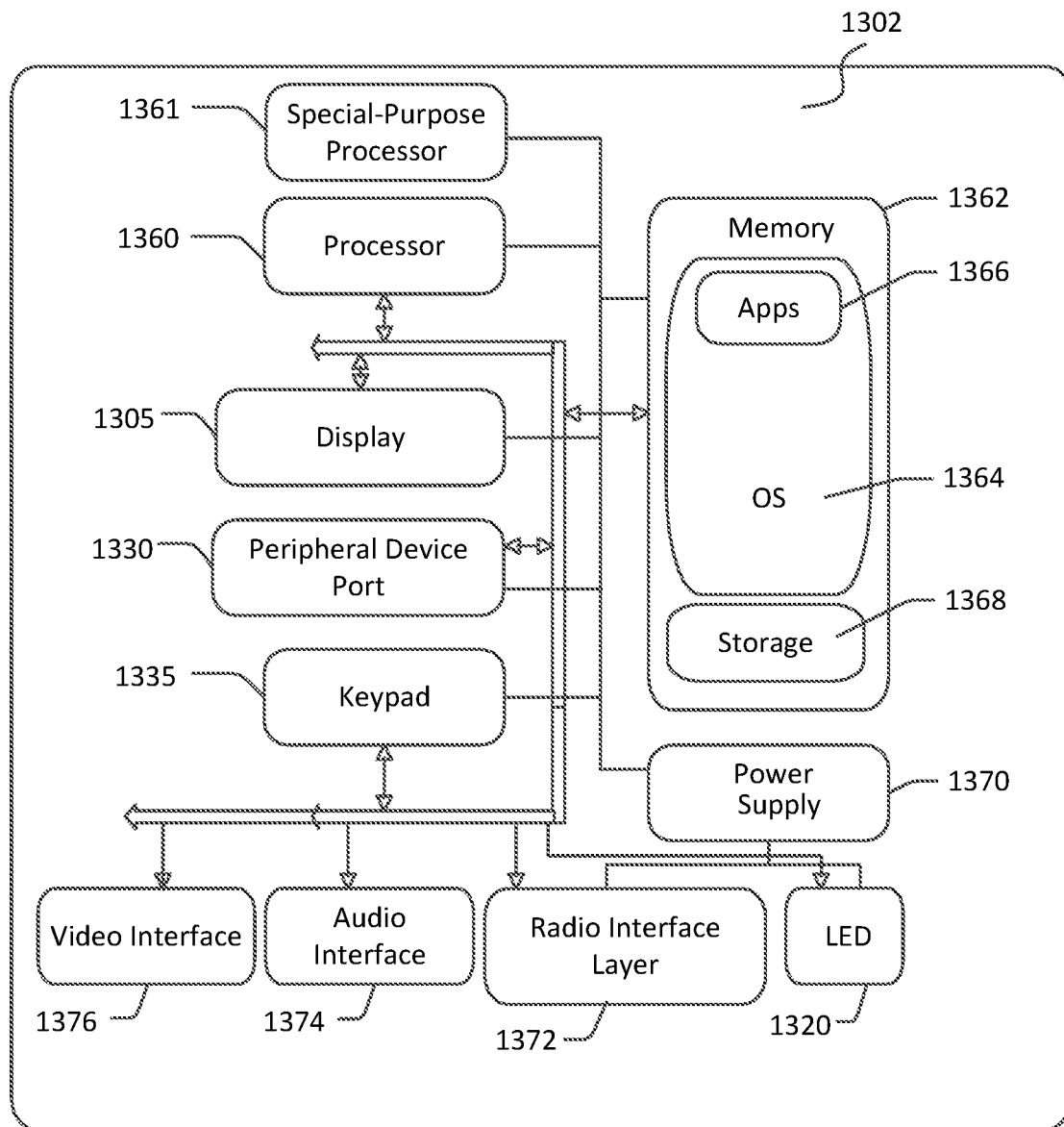

FIGS. 13A and 13B illustrate a mobile computing device 1300, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 13A, one aspect of a mobile computing device 1300 for implementing the aspects is illustrated. In a basic configuration, the mobile computing device 1300 is a handheld computer having both input elements and output elements. The mobile computing device 1300 typically includes a display 1305 and one or more input buttons 1310 that allow the user to enter information into the mobile computing device 1300. The display 1305 of the mobile computing device 1300 may also function as an input device (e.g., a touch screen display).

If included, an optional side input element 1315 allows further user input. The side input element 1315 may be a rotary switch, a button, or any other type of manual input element. In alternative aspects, mobile computing device 1300 may incorporate more or less input elements. For example, the display 1305 may not be a touch screen in some embodiments.

In yet another alternative embodiment, the mobile computing device 1300 is a portable phone system, such as a cellular phone. The mobile computing device 1300 may also include an optional keypad 1335. Optional keypad 1335 may be a physical keypad or a "soft" keypad generated on the touch screen display.

In various embodiments, the output elements include the display 1305 for showing a graphical user interface (GUI), a visual indicator 1320 (e.g., a light emitting diode), and/or an audio transducer 1325 (e.g., a speaker). In some aspects, the mobile computing device 1300 incorporates a vibration transducer for providing the user with tactile feedback. In yet another aspect, the mobile computing device 1300 incorporates input and/or output ports, such as an audio input (e.g., a microphone jack), an audio output (e.g., a headphone jack), and a video output (e.g., a HDMI port) for sending signals to or receiving signals from an external device.

FIG. 13B is a block diagram illustrating the architecture of one aspect of a mobile computing device. That is, the mobile computing device 1300 can incorporate a system (e.g., an architecture) 1302 to implement some aspects. In one embodiment, the system 1302 is implemented as a "smart phone" capable of running one or more applications (e.g., browser, e-mail, calendaring, contact managers, messaging clients, games, and media clients/players). In some aspects, the system 1302 is integrated as a computing device, such as an integrated personal digital assistant (PDA) and wireless phone.

One or more application programs 1366 may be loaded into the memory 1362 and run on or in association with the operating system 1364. Examples of the application programs include phone dialer programs, e-mail programs, personal information management (PIM) programs, word processing programs, spreadsheet programs, Internet browser programs, messaging programs, and so forth. The system 1302 also includes a non-volatile storage area 1368 within the memory 1362. The non-volatile storage area 1368 may be used to store persistent information that should not be lost if the system 1302 is powered down. The application programs 1366 may use and store information in the non-volatile storage area 1368, such as e-mail or other messages used by an e-mail application, and the like. A synchronization application (not shown) also resides on the system 1302 and is programmed to interact with a corresponding synchronization application resident on a host computer to keep the information stored in the non-volatile storage area 1368 synchronized with corresponding information stored at the host computer. As should be appreciated, other applications may be loaded into the memory 1362 and run on the mobile computing device 1300 described herein (e.g., search engine, extractor module, relevancy ranking module, answer scoring module, etc.).

The system 1302 has a power supply 1370, which may be implemented as one or more batteries. The power supply 1370 might further include an external power source, such as an AC adapter or a powered docking cradle that supplements or recharges the batteries.

The system 1302 may also include a radio interface layer 1372 that performs the function of transmitting and receiving radio frequency communications. The radio interface layer 1372 facilitates wireless connectivity between the system 1302 and the "outside world," via a communications carrier or service provider. Transmissions to and from the radio interface layer 1372 are conducted under control of the operating system 1364. In other words, communications received by the radio interface layer 1372 may be disseminated to the application programs 1366 via the operating system 1364, and vice versa.

The visual indicator 1320 may be used to provide visual notifications, and/or an audio interface 1374 may be used for producing audible notifications via the audio transducer 1325. In the illustrated embodiment, the visual indicator 1320 is a light emitting diode (LED) and the audio transducer 1325 is a speaker. These devices may be directly coupled to the power supply 1370 so that when activated, they remain on for a duration dictated by the notification mechanism even though the processor 1360 and other components might shut down for conserving battery power. The LED may be programmed to remain on indefinitely until the user takes action to indicate the powered-on status of the device. The audio interface 1374 is used to provide audible signals to and receive audible signals from the user. For example, in addition to being coupled to the audio transducer 1325, the audio interface 1374 may also be coupled to a microphone to receive audible input, such as to facilitate a telephone conversation. In accordance with embodiments of the present disclosure, the microphone may also serve as an audio sensor to facilitate control of notifications, as will be described below. The system 1302 may further include a video interface 1376 that enables an operation of an on-board camera 1330 to record still images, video stream, and the like.

A mobile computing device 1300 implementing the system 1302 may have additional features or functionality. For example, the mobile computing device 1300 may also include additional data storage devices (removable and/or non-removable) such as, magnetic disks, optical disks, or tape. Such additional storage is illustrated in FIG. 13B by the non-volatile storage area 1368.

Data/information generated or captured by the mobile computing device 1300 and stored via the system 1302 may be stored locally on the mobile computing device 1300, as described above, or the data may be stored on any number of storage media that may be accessed by the device via the radio interface layer 1372 or via a wired connection between the mobile computing device 1300 and a separate computing device associated with the mobile computing device 1300, for example, a server computer in a distributed computing network, such as the Internet. As should be appreciated such data/information may be accessed via the mobile computing device 1300 via the radio interface layer 1372 or via a distributed computing network. Similarly, such data/information may be readily transferred between computing devices for storage and use according to well-known data/information transfer and storage means, including electronic mail and collaborative data/information sharing systems.

Figure 14:
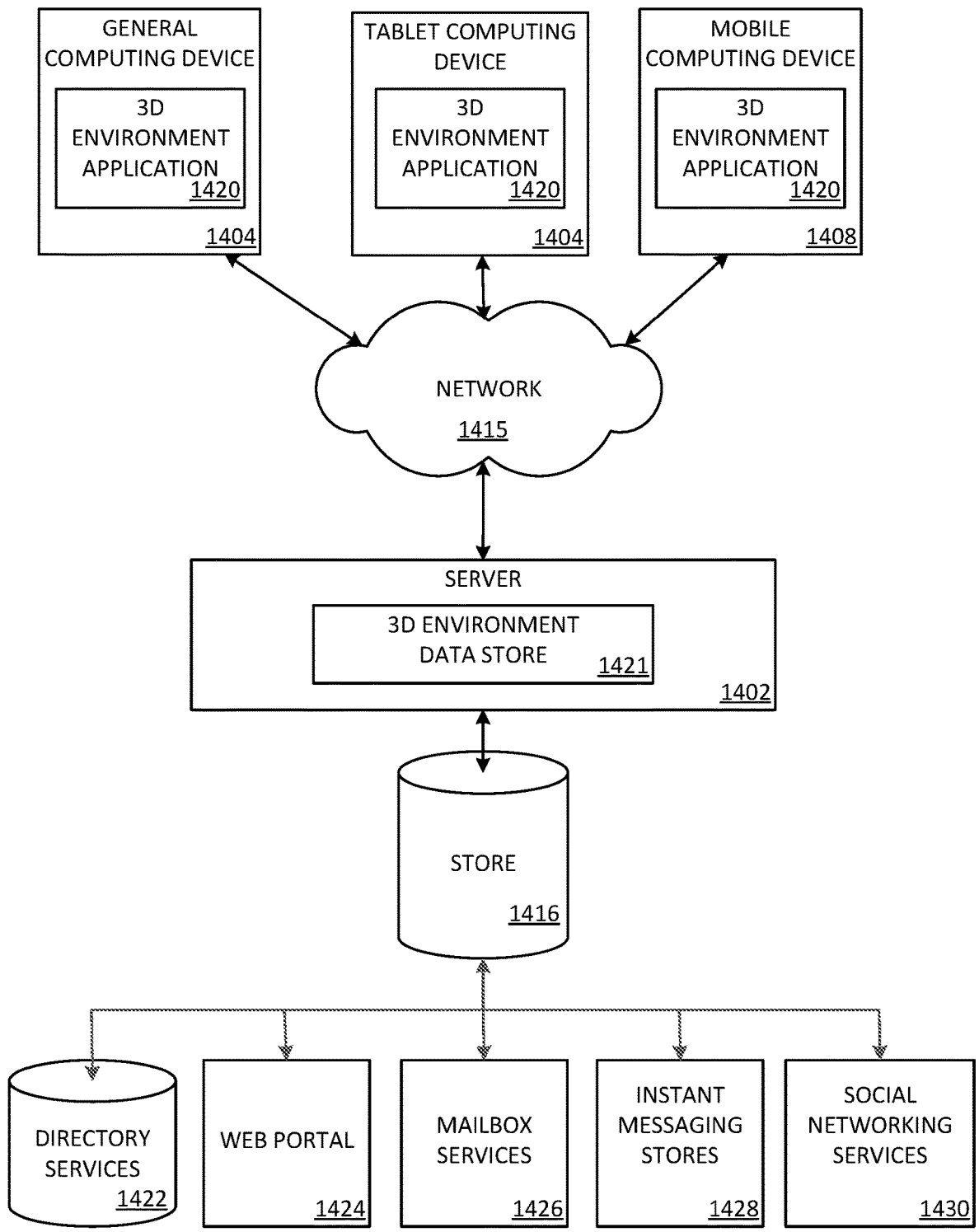
FIG. 14 is a simplified block diagram of a distributed computing system in which aspects of the present disclosure may be practiced.

FIG. 14 illustrates one aspect of the architecture of a system for processing data received at a computing system from a remote source, such as a personal computer 1404, tablet computing device 1406, or mobile computing device 1408, as described above. Content displayed at server device 1402 may be stored in different communication channels or other storage types. For example, various documents may be stored using a directory service 1422, a web portal 1424, a mailbox service 1426, an instant messaging store 1428, or a social networking site 1430.

A 3D environment application 1420 may be employed by a client that communicates with server device 1402, and/or the 3D environment data store 1421 may be employed by server device 1402. The server device 1402 may provide data to and from a client computing device such as a personal computer 1404, a tablet computing device 1406 and/or a mobile computing device 1408 (e.g., a smart phone) through a network 1415. By way of example, the computer system described above may be embodied in a personal computer 1404, a tablet computing device 1406 and/or a mobile computing device 1408 (e.g., a smart phone). Any of these embodiments of the computing devices may obtain content from the store 1416, in addition to receiving graphical data useable to be either pre-processed at a graphic-originating system, or post-processed at a receiving computing system.

Figure 15:
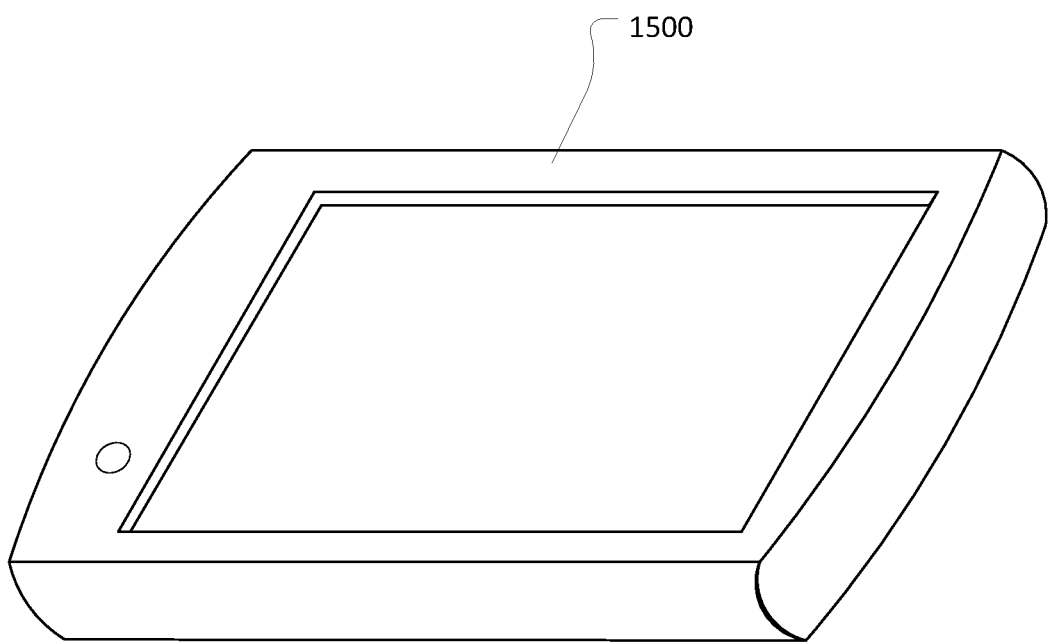
FIG. 15 illustrates a tablet computing device for executing one or more aspects of the present disclosure.

FIG. 15 illustrates an exemplary tablet computing device 1500 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of maintaining a focal point of a camera within a three-dimensional (3D) environment, the method comprising:
    displaying a two-dimensional (2D) graphical user interface (GUI) of an authoring application;
    displaying within the 2D GUI a 3D environment that includes a surface upon which one or more content items can be placed and a camera centrally positioned relative to the surface;
    receiving, via the 2D GUI, an indication to add a content item to the 3D environment;
    based on receipt of the indication to add the content item:
        determining a first elevation of the camera, wherein the first elevation represents the current elevation of the camera;
        determining an angle of view of the camera at the first elevation, wherein the determined angle of view displays a first portion of the surface; and
        elevating the camera to a second elevation that is greater than the first elevation of the camera while maintaining a perceived angle of view of the camera that is based upon the determined angle of view of the camera, wherein the elevated camera displays a second portion of the surface that is greater than, but includes, the first portion of the surface.

2. The method of claim 1, wherein the method further comprises:
    receiving an indication that the content item is placed on the surface; and
    based on receipt of the indication that the content item is placed on the surface, returning the camera to the first elevation while maintaining the perceived angle of view of the camera.

3. The method of claim 1, wherein the content item comprises at least one of a 2D content item, a 3D content item or 360 degree content item.

4. The method of claim 3, wherein the content item comprises a dynamic content item.

5. The method of claim 1, wherein the perceived angle of view is maintained relative to two of three axes that define the 3D environment and wherein elevation of the camera occurs along the remaining third axis of the three axes.

6. The method of claim 5, wherein the perceived angle of view is maintained by:
    selecting a target radius on the surface relative to the central position of the camera;
    determining a unit vector for the target radius; and
    multiplying the unit vector by the target radius to obtain a positioning vector for the camera in the two of three axes; and
    positioning the camera according to the positioning vector when the camera is at the second elevation.

7. The method of claim 6, wherein the determination of the unit vector is additionally based on a determined forward direction of the camera.

8. The method of claim 7, wherein determining the forward direction of the camera includes removing a pitch of the camera.

9. A system to maintain a focal point of a camera within a three-dimensional (3D) environment, the system comprising:
    a memory storing executable instructions;
    a display device; and
    a processor executing the stored instructions, wherein execution of the stored instructions causes the processor to:
        display a two-dimensional (2D) graphical user interface (GUI) of an authoring application on the display device;
        display within the 2D GUI a 3D environment that includes a surface upon which one or more content items can be placed and a camera centrally positioned relative to the surface;
        receive, via the 2D GUI, an indication to add a content item to the 3D environment;
        based on receipt of the indication to add the content item:
            determine a first elevation of the camera, wherein the first elevation represents the current elevation of the camera;
            determine an angle of view of the camera at the first elevation, wherein the determined angle of view displays a first portion of the surface; and
            elevate the camera to a second elevation that is greater than the first elevation of the camera while maintaining a perceived angle of view of the camera that is based upon the determined angle of view of the camera, wherein the elevated camera displays a second portion of the surface that is greater than, but includes, the first portion of the surface.

10. The system of claim 9, wherein the processor is further caused to:

receive an indication that the content item is placed on the surface; and based on receipt of the indication that the content item is placed on the surface, return the camera to the first elevation while maintaining the perceived angle of view of the camera.

11. The system of claim 10, wherein the perceived angle of view is maintained relative to two of three axes that define the 3D environment and wherein elevation of the camera occurs along the remaining third axis of the three axes.

12. The system of claim 11, wherein the perceived angle of view is maintained by causing the processor to:

select a target radius on the surface relative to the central position of the camera;

determine a unit vector for the target radius;

multiply the unit vector by the target radius to obtain a positioning vector for the camera in the two of three axes; and position the camera according to the positioning vector when the camera is at the second elevation.

13. A method of translating a three-dimensional (3D) object, the method comprising:

displaying a two-dimensional (2D) graphical user interface (GUI) of an authoring application;

displaying within the 2D GUI a 3D environment that includes a surface upon which the 3D object has been placed and a camera centrally positioned relative to the surface;

receiving an indication to translate the 3D object within the 3D environment;

in response to receiving the indication to translate the 3D object:

preventing translation of the 3D object in one of three dimensions of the three-dimensional environment; and enabling simultaneous translation of the 3D object in the two remaining dimensions of the three dimensions of the 3D environment.

14. The method of claim 13, further comprising converting the two remaining dimensions from Cartesian coordinates that identify a position of the 3D object within the 3D environment to polar coordinates that correspondingly identify the position of the 3D object.

15. The method of claim 13, wherein the indication to translate the 3D object indicates one of at least two translation modes.

16. The method of claim 15, wherein a first translation mode of the at least two translation modes prevents translation in a height dimension of the three dimension and enables simultaneous translation in a distance dimension and an angle dimension of the three dimensions.

17. The method of claim 16, wherein a second translation mode of the at least two translation modes prevents translation in the distance dimension and enables simultaneous translation in the height and angle dimensions.

18. The method of claim 17, wherein receiving an indication to translate the 3D object includes a first indication to translate the 3D object in the first translation mode and a subsequent second indication to translate the 3D object in the second translation mode.

19. The method of 18, wherein preventing translation in the height dimension comprises fixing an elevation of the 3D object relative to the platter.

20. The method of claim 19, wherein preventing translation in the distance dimension comprises fixing the position of the 3D object in a plane defined by the platter.

* * * * *